(12) United States Patent
Huang et al.

(10) Patent No.: US 11,442,697 B2
(45) Date of Patent: Sep. 13, 2022

(54) CHIP-INTEGRATED DEVICE AND METHODS FOR GENERATING RANDOM NUMBERS THAT IS RECONFIGURABLE AND PROVIDES GENUINENESS VERIFICATION

(71) Applicant: THE TRUSTEES OF THE STEVENS INSTITUTE OF TECHNOLOGY, Hoboken, NJ (US)

(72) Inventors: Yuping Huang, Norwood, NJ (US); Yong Meng Sua, Jersey City, NJ (US); Jiayang Chen, Jersey City, NJ (US); Lac Thi Thanh Nguyen, Jersey City, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 246 days.

(21) Appl. No.: 16/624,768

(22) PCT Filed: Jun. 27, 2018

(86) PCT No.: PCT/US2018/039870
§ 371 (c)(1),
(2) Date: Dec. 19, 2019

(87) PCT Pub. No.: WO2019/006039
PCT Pub. Date: Jan. 3, 2019

(65) Prior Publication Data
US 2021/0141609 A1    May 13, 2021

Related U.S. Application Data

(60) Provisional application No. 62/525,412, filed on Jun. 27, 2017.

(51) Int. Cl.
*G06F 7/58* (2006.01)
*H04L 9/08* (2006.01)

(52) U.S. Cl.
CPC ............ *G06F 7/588* (2013.01); *H04L 9/0852* (2013.01); *H04L 9/0869* (2013.01)

(58) Field of Classification Search
CPC .................................. G06F 7/58; G06F 7/588
(Continued)

(56) References Cited

U.S. PATENT DOCUMENTS

2013/0036145 A1* 2/2013 Pruneri ................... G06F 7/588
708/191
2014/0016168 A1   1/2014 Marandi et al.
(Continued)

OTHER PUBLICATIONS

F. Xu et al., Experimental fast quantum random number generation using high-dimensional entanglement with entropy monitoring, arXiv:1608.08300v1 [quant-ph], 2016 (Year: 2016).*
(Continued)

*Primary Examiner* — Emily E Larocque
(74) *Attorney, Agent, or Firm* — Lewis Roca Rothgerber Christie LLP

(57) ABSTRACT

A device for generation of genuine random numbers, uses quantum stochastic processes in optical parametric nonlinear media. The dimensionality of the random numbers is varied from 2 to over 100,000. Their statistical properties, including the correlation function amongst random numbers, are tailored using linear and nonlinear optical circuits following the parametric nonlinear media. Both the generation and manipulation of random numbers are integrated on a single nanophotonics chip. By incorporating optoelectric effects, fast streams of random numbers are created in custom statistical properties, which are updated or reconfigured in real time, such as at 10 GHz speed. The unpredictability of the random numbers is quantifying by evalu- (Continued)

ating their min-entropy. The genuineness of quantum random numbers is tested using both statistical tools and independently verified by measuring the quantum entanglement between the photons in real time.

22 Claims, 17 Drawing Sheets

(58) Field of Classification Search
USPC .................................................. 708/250, 255
See application file for complete search history.

(56) References Cited

U.S. PATENT DOCUMENTS

| | | | |
|---|---|---|---|
| 2018/0241480 A1* | 8/2018 | Hughes | G06N 10/00 |
| 2020/0257502 A1* | 8/2020 | Steinle | H01S 3/1083 |

OTHER PUBLICATIONS

Hochrainer, Low-Loss Optical Elements for a Loophole-Free Bell Test, Thesis, Vienna University of Technology, 2014 (Year: 2014).*
T. Chen et al., 27-Meter-Long Ultra-Low-Loss Optical Delay Line on a Silicon Chip, 2012 Conference on Lasers and Electro-Optics (CLEO), IEEE, 2012 (Year: 2012).*
M. Florentino et al., All-fiber-optic quantum random number generator, OSA/CLEO, 2006 (Year: 2006).*
L. Nguyen et al., Programmable quantum random number generator without postprocessing, Optics Letters, vol. 43, No. 4, 2018 (Year: 2018).*
L. Nguyen et al., Quantum Random Number Generator with Programmable Probability Distributions, Frontiers in Optics, Laser Science, OSA, 2018 (Year: 2018).*
Notification Concerning Transmittal of International Preliminary Report on Patentability dated Jan. 9, 2020 in PCT/US2018/039870. (9 pages).
International Search Report and Written Opinion dated Apr. 10, 2018 in PCT/US2018/039870. (11 pages).
Feihu Xu et al., Experimental fast quantum random number generation using high-dimensional entanglement with entropy monitoring, Optica Society of America, Oct. 28, 2016, pp. 1266-1269, vol. 3, No. 11. (4 pages).
V Caprara Vivoli et al., Comparing different approaches for generating random numbers device-independently using a photon pair source, New Journal of Physics, Feb. 10, 2015, p. 23023, vol. 17, No. 2. (8 pages).
You-Qi Nie et al., Experimental measurement-device-independent quantum random number generation, Cornell University Library, Dec. 7, 2016, pp. 1-15. (15 pages).
Tong Chen et al., 27-Meter-Long Ultra-Low-Loss Optical Delay Line on a Silicon Chip, Optical Society of America, May 6, 2012, pp. 1-2. (Abstract) (3 pages).

* cited by examiner

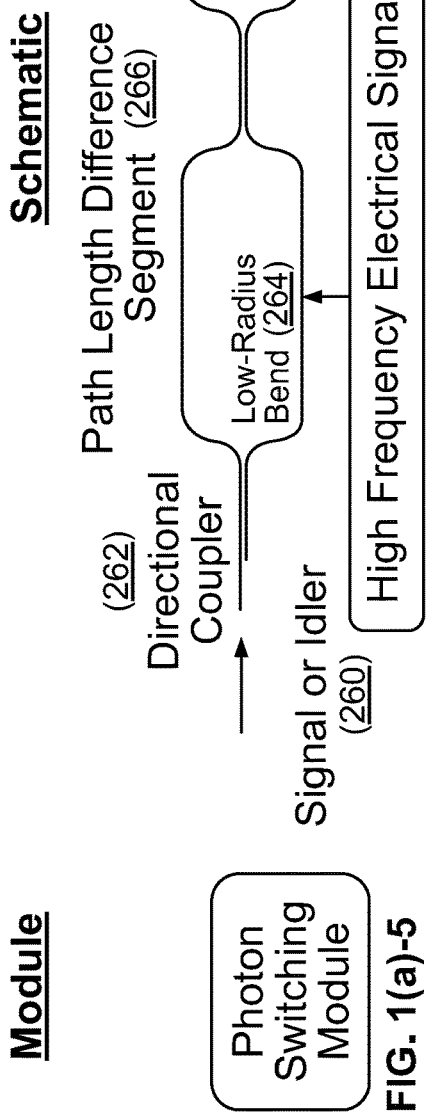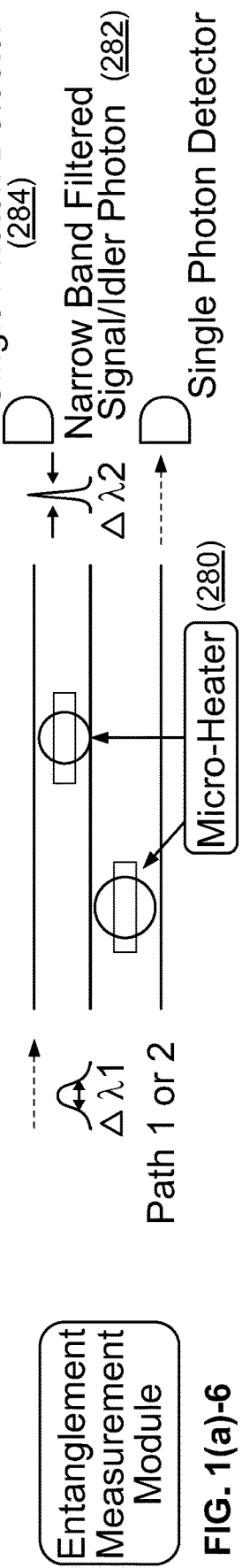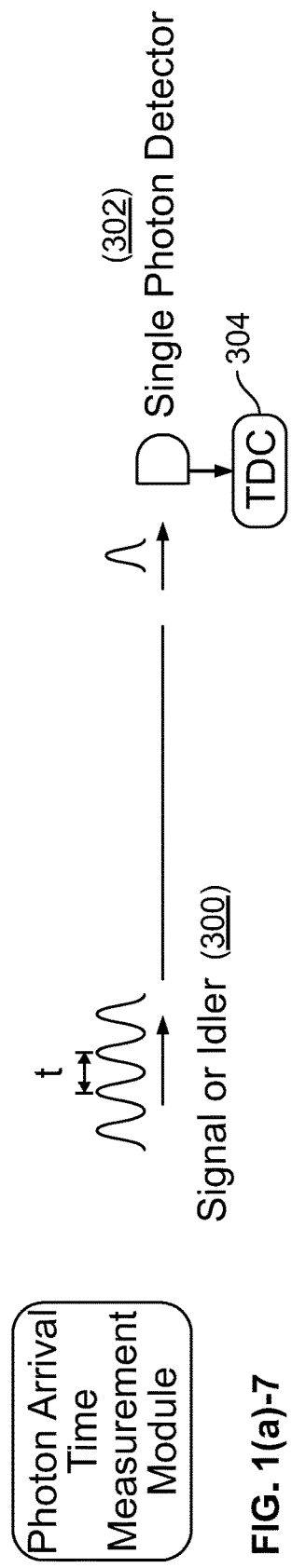
FIG. 1(a)-5
FIG. 1(a)-6
FIG. 1(a)-7

CHIP-INTEGRATED DEVICE AND METHODS FOR GENERATING RANDOM NUMBERS THAT IS RECONFIGURABLE AND PROVIDES GENUINENESS VERIFICATION

CROSS-REFERENCE TO RELATED APPLICATIONS

This application is an application under 35 U.S.C. § 371 of International Application No. PCT/US2018/039870, filed Jun. 27, 2018 and entitled "CHIP-INTEGRATED DEVICE AND METHODS FOR GENERATING RANDOM NUMBERS THAT IS RECONFIGURABLE AND PROVIDES GENUINENESS VERIFICATION," which claims priority to U.S. Provisional Patent Application Ser. No. 62/525,412 filed Jun. 27, 2017, the entire disclosures of which applications are incorporated herein by reference in their entireties.

FIELD OF THE INVENTION

The present disclosure relates to random number generators and more particularly, those using quantum stochastic phenomena for producing the random numbers.

BACKGROUND OF THE INVENTION

Random numbers are an indispensable resource for a range of applications, including encrypted communications and analyses of stochastic processes in the realms of physics, biology and finance, e.g., to simulate dynamic market behaviors. Both classical stochastic processes, which can be described by Newton's laws of physics, and quantum stochastic processes, which are described by quantum mechanics, can be exploited to create random numbers. Quantum stochastic processes are capable of generating genuine random numbers whose randomness originates in the probabilistic nature of quantum physics. Such sources of random numbers, sometimes referred to as quantum random number generators, can be reliable, unbiased, and trustable.

In some quantum random number generators, quantum random numbers are produced by creating single photons, the quanta of light, in superposition states of electromagnetic mode 0 and mode 1. When measured, the photons are collapsed into either mode probabilistically according to their superposition states. In another approach, quantum random numbers are produced utilizing the inherent phase noise of lasers. A concern exists that random number generation can be distorted by computer hacking, spoofing, data manipulation through backdoor operations or cyberattacks. For example, it is possible that the phase noise of a laser can be controlled by an adversary to modify the statistical properties of the random number generated thereby. Alternative apparatus and methods for generating random numbers are therefore of continued interest.

SUMMARY

The disclosed subject matter relates to apparatus, systems and methods for generating quantum random numbers.

In one embodiment, a device is provided for use in directly generating random numbers with certified randomness obeying customized statistical properties. The device includes a laser source for generating laser pulses in designed and verified waveforms. A photon generator is positioned relative to the laser source to receive the laser pulses for generating photons in the waveforms and correlated quantum states to directly produce random numbers obeying desirable statistical properties as specified by a user, while a separator is positioned relative to the photon generator to receive and direct the photons into separated optical paths based on at least one quantum characteristic. The device is also provided with a set of detectors, positioned relative to the separator, to receive separated photons and to provide corresponding output signals to electronic circuits for generating random numbers based on the output signals, as well as an entanglement measurement module, based on the results of the photon detection by the detectors, to certify the genuineness of the random numbers.

In one embodiment, the device described above further includes linear and nonlinear optical circuits in each of the optical paths to modify optical properties of the photons.

In one embodiment, the device described above further includes a benchmark module to test the random numbers against statistical tests for random numbers.

In one embodiment, the photons generated by the photon generator include a stream of single photons or pairs of entangled signal and idler photons in customized statistical properties.

In one embodiment, the photon generator includes a nonlinear waveguide or cavity made from lithium niobate that is phase matched for generating the photons.

In one embodiment, the at least one quantum characteristic includes two-photon entanglement in frequency and time domains.

In one embodiment, the separator is configured to separate the photons into pairs of entangled signal and idler photons based on their wavelengths.

In one embodiment, the separator includes at least one wavelength division demultiplexing device.

In one embodiment, the device described above includes first straight and spiral waveguides and second straight and spiral waveguides.

In one embodiment, the separator further includes optical modulators for routing signal and idler photons received from the demultiplexing device into the first straight and spiral waveguides and the second straight and spiral waveguides, respectively.

In one embodiment, each of the first and second spiral waveguides is provided with a predetermined length for determining and delaying single photon temporal modes in real time.

In one embodiment, the device described above further includes a laser modulator associated with the laser source.

In one embodiment, the laser source, the photon generator, the nonlinear waveguides, the separator, the first and second spiral waveguides, the entanglement measurement module, and the photon detectors are integrated on a single microchip.

In one embodiment, a method is provided for use in directly generating random numbers with certified randomness obeying customized statistical properties. The method includes the steps of generating laser pulses in designed and verified waveforms and receiving the laser pulses in a photon generator for generating photons in the waveforms and correlated quantum states to directly produce random numbers obeying desirable statistical properties as specified by a user. The photons are directed into separated optical paths based on at least one quantum characteristic. The separated photons are then detected to provide corresponding output signals to electronic circuits for generating random numbers based on the output signals. An entanglement measurement module, based on the results of the photon detection by the detectors, is also provided to certify the genuineness of the random numbers.

In one embodiment, the randomness originates in the quantum uncertainties in photons whose dimensionality varies from 2 to over 100,000.

In another embodiment, the probability distributions of the quantum random numbers can be programmed into the quantum process of random number creation, producing genuine quantum random numbers with custom statistical properties without the need for computer post-processing In another embodiment, the probability distributions can be updated in real time, e.g., at a speed of 10 GHz, allowing simulating dynamic stochastic processes at high speed.

In another embodiment, the correlation or joint probability distributions of random numbers can be programmed and verified in real time.

In another embodiment, the quantum circuits for random number generation and the circuits for programming the statistical properties of the random numbers are integrated on a microchip.

In another embodiment, the genuineness of quantum random numbers is tested using statistical tools.

In another embodiment, the statistical tools include the National Institute of Standards and Technology (NIST) Statistics Test Suite.

In another embodiment, the statistical tools include the Dieharder Test Suite.

In another embodiment, the genuineness of quantum random numbers is verified by measuring the quantum entanglement between the photons in real time.

BRIEF DESCRIPTION OF THE DRAWINGS

For a more complete understanding of the present disclosure, reference is made to the following detailed description of exemplary embodiments considered in conjunction with the accompanying drawings.

FIG. 1(a)-1 is a schematic diagram illustrating a waveform generation module of the system shown in FIG. 1(a) in accordance with an embodiment of the present disclosure.

FIG. 1(a)-2 is a schematic diagram illustrating a nonlinear process module of the system shown in FIG. 1(a) in accordance with an embodiment of the present disclosure.

FIG. 1(a)-4 is a schematic diagram illustrating a wavelength de-multiplexing module of the system shown in FIG. 1(a) in accordance with an embodiment of the present disclosure.

FIG. 1(a)-5 is a schematic diagram illustrating a photon switching module of the system shown in FIG. 1(a) in accordance with an embodiment of the present disclosure.

FIG. 1(a)-6 is a schematic diagram illustrating an entanglement measurement module of the system shown in FIG. 1(a) in accordance with an embodiment of the present disclosure.

FIG. 1(a)-7 is a schematic diagram illustrating a photon arrival time measurement module of the system shown in FIG. 1(a) in accordance with an embodiment of the present disclosure.

FIG. 1(a)-9 is a schematic diagram illustrating a spatial division multiplexing module of the system shown in FIG. 1(a) in accordance with an embodiment of the present disclosure.

FIG. 1(a)-10 is a schematic diagram illustrating a quantum state transformation module of the system shown in FIG. 1(a) in accordance with an embodiment of the present disclosure.

FIG. 2 is schematic diagram of a solid state microchip in accordance with an embodiment of the present disclosure.

FIG. 4 is a scanning electron micrograph of a cross-section of a lithium niobate nanowire waveguide in accordance with an embodiment of the present disclosure.

FIG. 5 shows an SEM image of the Ti—Au electrode teeth pattern and an etched sub-micron PPLN waveguide in accordance with an embodiment of the present disclosure.

FIG. 6 is a scanning electron micrograph from a plan perspective of a lithium niobate micro-ring with coupling nanowire in accordance with an embodiment of the present disclosure.

FIG. 8 is a scanning electron micrograph with a 45-degree view angle of a lithium niobate micro-disk with coupling nanowire in accordance with an embodiment of the present disclosure

DETAILED DESCRIPTION OF EXEMPLARY EMBODIMENTS

An aspect of the present disclosure is the recognition that for many applications, it is desirable to generate genuine random numbers that obey selected probability distributions or correlations. In addition, those random numbers sometimes need to exist in a high-dimensional Hilbert space, i.e., spanning over many modes. In principle, the distributions, correlations, and dimensionalities of random numbers can be modified by post processing, e.g., by using many ancillary random numbers. However, the post processing can be slow, require complicated algorithms, consume a significant amount of computing power, increase data security vulnerability, and sometimes may not be successful. These factors make it difficult, if not impossible, to produce reliable post processed quantum random numbers for large scale applications where speed, capacity, and cost are important considerations.

The disclosed quantum random number generator (QRNG) methods and procedures are able to provide high bit rate random numbers with reconfigurable distributions and correlations with min-entropy close to unity. In a typical example, the disclosed QRNG methods and procedures have produced bias—free random numbers with more than 38 dB quantum-to-classical noise ratio, and which do not require any post-processing procedure. In a typical example, the random numbers generated by the disclosed QRNG methods and procedures passed the various empirical randomness tests including Statistical Test Suite (STS) for Random and Pseudorandom Number Generators for Cryptographic Applications by National Institute of Standards and Technology (NIST), and Dieharder: a random number test suite (DBT) by Robert Brown and George Marsaglia. In addition, the disclosed QRNG methods and procedures as an entropy source is validated by following the recommendation for the entropy sources used for Random Bit Generation by NIST (800-90B). The QRNG methods and procedures disclosed herein can be made compact on a scalable nanophotonic integrated circuit.

Figure 1:
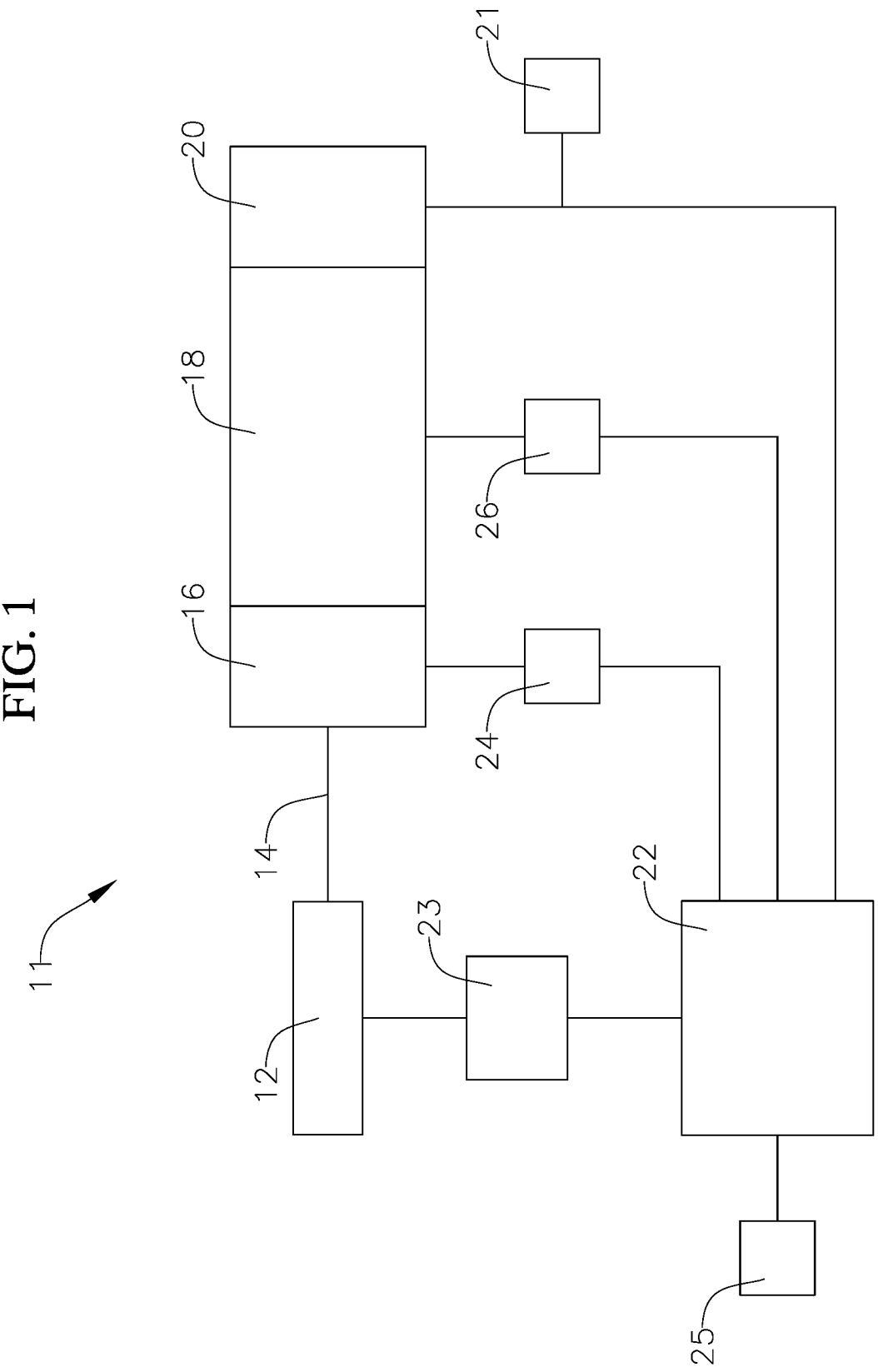
FIG. 1 is a schematic diagram of a random number generator system in accordance with an embodiment of the present disclosure.

FIG. 1 shows a system 11 for generating random numbers, including a laser 12, the beam 14 of which is received in a stochastic photon generator 16. The photon generator 16 generates photons through nonlinear optical processes. A separator 18, separates photons opto-electronically for linear logical operations and nonlinear interactions of the created photons. A detector array 20, senses the photon output of the separator 18 for independent verification of genuine randomness by measuring the quantum entanglement between the photons, such as through an entanglement measurement module 21, which based on the results of the photon detection by the detector array 20, certifies the genuineness of the random numbers. A computer 22 programmatically controls the laser 12 (e.g., through a laser modulator 23 associated with laser 12) and acts through interfaces 24, 26 to provide analog and digital control signals to the photon generator 16 and the separator 18. The output from the detector 20 is received in the computer 22 for interpretation and generation of random numbers. In one embodiment, the system 11 further includes a benchmark module 25 to test the random numbers against statistical tests for random numbers. The computer provides a user interface that allows a user to enter statistical parameters, based upon which the computer controls the laser 12, the photon generator 16 and the separator 18 in order to generate random numbers in a form useful for a specific application.

Figure 1A:
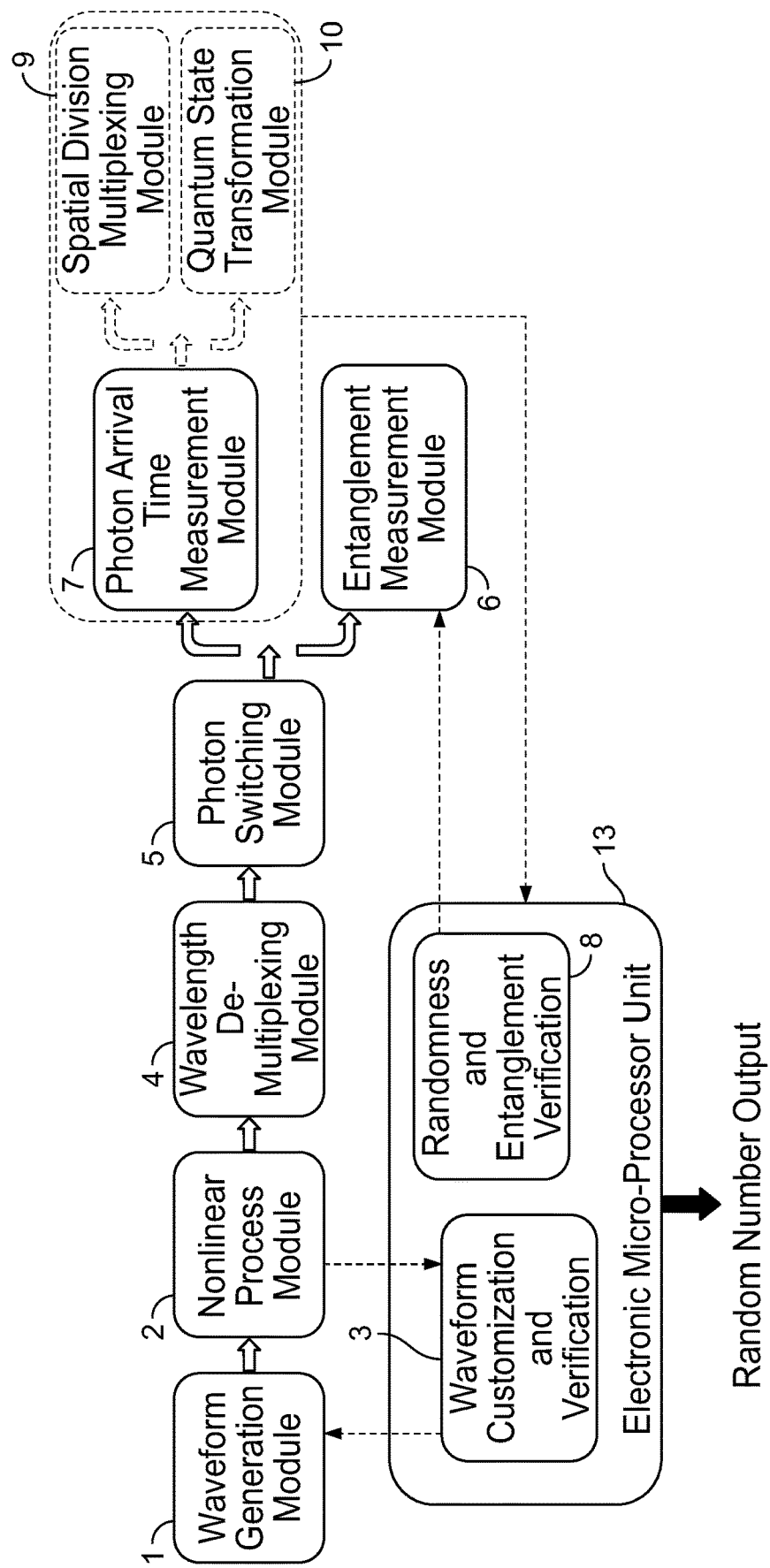
FIG. 1(a) is a schematic diagram of a random number generator system in accordance with another embodiment of the present disclosure.
Figures 1, 1A:
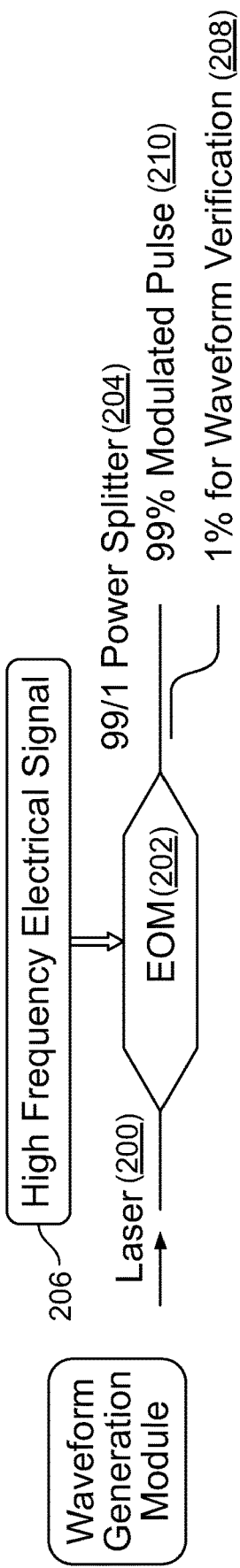

FIG. 1(a) shows the procedures for generating quantum random numbers and genuineness verification process in this disclosed QRNG methods and procedures.

The laser pump pulses are arbitrarily-shaped and reconfigurable via electro-optic modulation, controlled by an electronic micro-processing unit 13 with a feedback loop for waveform verification and optimization 3. The waveform verification is carried out using an optical measurement device, such as an optical oscilloscope or a frequency-resolving optical gating (FROG) device (such as by Swamp Optics, LLC, at Atlanta, Ga.). If the measured waveform is not satisfactory, the modulation will be modified for improvement. This process is iterated till the desirable waveform is measured. Electronic micro-processing unit 13 may also incorporate a module 8 for entanglement and randomness verification.

Figures 1, 1A, 2:

The created laser pump pulses are guided through a nonlinear process module 2 (FIG. 1(a)-2) for generation of broadband time-frequency entangled photon pairs in signal and idler wavelengths via optical parametric nonlinear processes, such as spontaneous parametric down conversion (SPDC) or spontaneous four wave mixing (SFWM), as a result of quantum vacuum fluctuations.

Subsequently, a wavelength de-multiplexing module 4 (FIG. 1(a)-4) is used to first separate the pump pulses and broadband photon pairs. Then, broadband entangled photon pairs will be spatially separated according the wavelength (energy) of each photon.

By using an optional photon switching module 5 (FIG. 1(a)-5), the signal and idler photon can be routed to an entanglement measurement module 6 (FIG. 1(a)-6) for quantifying the nonlocal frequency correlation of the photon pair for genuineness verification, or to a photon arrival time measurement module 7 (FIG. 1(a)-7) for random number generation. The signal and idler photons can be measured independently by using single photon detectors. For genuineness verification, the two-photon joint spectral coincidence measurement can be used to confirm the correlation between the single and idler photons, validating the random number originated from same and provably random quantum fluctuation process by using an electronic micro-processing unit 13. In one embodiment, the probability of measuring two photons created in paired frequency modes, as dictated by the energy conservation requirement during the process where they are created, is compared with that of measuring two photons in unpaired frequency modes. If the former probability is at least 10 times larger than the latter probability, then the correlation is confirmed. In addition, coincidence measurement can be used to quantify the degree of correlation of random number.

For random number generation, the arrival times of signal and idler photons are measured by single photon detectors with respect to a reference pulse and recorded by using a time-to-digital converter 304 or a Field Programmable Gate Array (FPGA) device in a photon arrival time measurement module 7. The arrival time of the signal and idler photons is always random as promised by fundamental law of quantum mechanics; thus, the digitalized arrival time information will return a string of random numbers with impeccable randomness. Other options that can be explored by the QRNG methods and procedures disclosed herein include multi-dimensional random numbers that can be produced by measuring the quantum states of signal and idler photons in high-dimensional Hilbert spaces. In addition to the arrival time information, the single photon detection can be probabilistically projected into different detectors by using an optional spatial division multiplexer module 9 (FIG. 1(a)-9). Another method is by utilizing the naturally rich time-frequency electromagnetic modes of the broadband SPDC or SFWM photons, where one can sort the signal and idler photon in different temporal time-frequency modes by employing a mode-sorting detection. See A. Shahverdi, Y. M. Sua, L. Tumeh, and Y.-P. Huang, "Quantum Parametric Mode Sorting: Beating the Time-Frequency Filtering," Scientific Report 7 6495 (2017). This can allow an increase in the high dimensionality of random numbers that can be created by measuring the fine feature of single photons. Another functionality that can be achieved by this QRNG methods and procedures disclosure is the real time configuration and manipulation of the correlations between sets of random numbers or distribution of the random numbers.

Configurable, arbitrarily-shaped laser pump pulses for generating distributed quantum random numbers are prepared in a waveform generation module 1 (FIG. 1(*a*)-1). In this embodiment, the waveform generation module 1 (FIG. 1(*a*)-1) consists of a 780 nm narrow linewidth laser source 200 with power fluctuation <0.5%, a high-speed electro-opto-modulator (EOM) 202 with extinction ratio >15 dB and a 99/1 ratio power splitter 204. An example of an on chip narrow linewidth laser can be realized by using reflective semiconductor optical amplifier coupled to a low-loss silicon nitride ring resonator as a partial reflector and single mode locker. The on-chip laser can be driven by a low noise laser diode driver controlled by a FPGA device. The modulating electrical signal 206 for the electro-opto modulator can be prepared digitally with a FPGA and a voltage amplifier. The 1% output from the power splitter 208 can be used for waveform monitoring and providing feedback to the FPGA device for waveform optimization in real time, while 99% of the modulated light 210 proceeds to the nonlinear process module 2 as the shaped pump pulse.

The nonlinear process module 2 can be made of nonlinear optical materials with second-order or third-order nonlinearities. Typical examples are periodically poled lithium niobate nano-waveguides and silicon nano-waveguides, each allowing efficient SPDC and SFWM for the single photons and entangled photon pair generation. The phase matching of the nonlinear optical material can be tailored by geometry dispersion, periodic poling, or other methods, for broadband SPDC and SFWM processes with abundant time-frequency electromagnetics modes.

The wavelength de-multiplexing module 4 consists of two sections. The first is to separate the pump pulse from the generated single photons or entangled photon pairs, for instance by using one or a sequence of adiabatic waveguide couplers. The second section is to pick the broadband single photons and entangled photon pairs by utilizing wavelength de-multiplexing, using, for example, array waveguide grating or cascaded mirroring add-drop filters. Such wavelength division de-multiplexing will route the signal and idler photons into different optical paths, thus fully harnessing the abundant time-frequency electromagnetics modes of the SPDC and SFWM source.

The optional optical switching module 5, shown in FIG. 1(*a*)-5, consists of another electro-opto-modulator for active high-speed switching of the signal and idler photons. This will allow users to switch the photon for the purpose of randomness and entanglement verification without the need of executing statistical tests on the random number. In addition, this verification procedure will allow the user to monitor the genuineness of the random number and integrity of the quantum entropy source. This provides another physical layer of protection from the potential tampering effort by any adversaries on the QRNG disclosed herein. A typical example for the photon switching module comprises directional couplers 262, low-radius bends 264, and path-length difference segment 266, electrodes and 2 optical outputs ports for photon splitting. One of the paths (path 1) is guided to the entanglement measurement module, where the two-photon joint spectral density by the means of coincidence measurement can be carried out. The joint spectral density measurement can be understood as the two-dimensional probability distribution over the spectra of signal and idler photons, thus allowing one to quantify and verify the degree of correlation (inseparability) between the signal and idler photons. As any tempering on either signal or idler photons will introduce disturbances to the joint spectral density, this serves as an indicator to monitor and verify the genuineness of the random numbers. To carry out this measurement, two tunable narrowband optical filters are used to resolve the frequency (wavelength) component of the signal and idler photon while measuring their coincidences. Another path (path 2) is routed to photon arrival time measurement module for random number generation.

To carry out entanglement measurement FIG. 1(*a*)-6, two tunable narrowband optical filters are used to resolve the frequency (wavelength) component of the signal and idler photon while measuring their coincidences An example of the narrowband tunable filter is microring add and drop filters with a resonant cavity tuned by a micro-heater 280. To register a coincidence detection, the signal and idler photons 282 are detected independently by using two separate single photon detectors 284. A typical single photon detector on-photonic chip can be an InGaAs avalanche photon diode or superconducting nanowire single-photon detector, where the presence of the signal and idler photons can be recorded with high efficiency. Each detected signal or idler photon will result in a detection count and a coincidence count being registered when both detectors record a detection within a predetermined time-coincidence window. The resultant coincidence counts as a function of the tunable filters' wavelengths. Both signal and idler paths are used to form the joint spectral density.

In some embodiments, the optical switching module is replaced by a beamsplitter, where photons are randomly routed to time measurement or entanglement measurement.

The random numbers are generated in the photon arrival time measurement module 7 FIG. 1 (*a*)-7, where both signal and idler photons 260 are independently detected by single photon detectors. In each detection, the photon arrival time with respect to a reference electronic pulse is recorded by using a time-to-digital converter 304 (TDC). To eliminate potential bias caused by the multiphoton effects, for the random numbers generated by the QRNG disclosed herein, the photon detection rate is kept at less than 0.01 per pulse. Each photon detection event of a signal or idler photon 300 triggers an analog electrical pulse from the single photon detector 302 with typically a few ns in full width at half-maximum (FWHM), which is sent to the TDC 304 or a FPGA as a STOP signal. At another TDC input, a deterministic electrical pulse train from the electronic microprocessor unit such as FPGA (10 ns FWHM, 1 MHz repetition rate) is used as the reference (REF) signal. The arrival time of both the REF and STOP pulses are digitized and compared in the TDC 304 where their difference is returned with 10-ps timing resolution and 1-ps time-bin size.

In a typical application, the period of the REF signal is set at 1 μs, corresponding to a 1 MHz repetition rate. Given the 10-ps timing resolution of the TDC, we apply the time series binning to obtain the time-bin size of 10 ps so that the photon detection can occur over a total of 100,000 time bins, whose time-bin location is recorded to generate QRNs. Direct arrival time-to-digital conversion via TDC eliminates the need for any post-processing such as randomness distillation or distribution transformation. The stochastic arrival time of single photons arise from the quantum vacuum fluctuations, whose temporal waveforms are shaped using an electro-optical modulator to ensure the generated random number in a user-defined probability distribution.

For the QRNG disclosed herein, the quality of the QRNs is mainly limited by the dark counts of the single photon detector. This is a common challenge in almost all single-photon-detection-based approaches, because of which the security of the QRNs can be compromised. Quantum-to-classical ratio (QCR), defined as the ratio of the registered photon counts from single photons (Np) to those from the detector dark counts (Nd), is given as $QCR=10 \log_{10} (Np/Nd)$. With the available low dark count of the Si-APD (~1.4 Hz), our QCR is demonstrated to be more than 36 dB even for a very low mean photon counting rate ~ of 0.01 per pulse. While such a high QCR may not be critical for uniform random numbers as the dark counts themselves are usually uniformly distributed, it is critical for creating QRNs in non-uniform distributions. The current ultrahigh QCR leads to ultra-pure QRNs with negligible bias whose statistics reflect the fundamentally stochastic quantum entropy source of the QRNG disclosed.

The signal and idler photon can be routed to an optional spatial division multiplexing module 9 in FIG. 1(a)-9 to add dimensionalities of the generated random numbers or to improve their bit rate or length. One example is the 1 by 8 spatial division multiplexing by using 3 cascaded 1-by-2 splitters 322 on one section of a nano-photonics chip with one on-chip single photon detector 324, which can be placed at the end of the 8 outputs. The detection probability at those 4 outputs can be properly adjusted to prevent unwanted bias in the random number. This spatial division multiplexing is highly scalable with the current state-of-the-art integrated photonics nano-fabrication technology.

A quantum state transformation module 10 in FIG. 1(a)-10 can be optionally added to dynamically reconfigure and manipulate the correlation between the sets of random numbers from multiple outputs or the distribution of the random number at each output. The quantum state transformation model utilizes the naturally rich time-frequency electromagnetic modes of the broadband SPDC or SFWM photons, where one can sort the signal and idler photon 320 in different temporal time-frequency modes by employing a mode-sorting detection. One implementation of this quantum state transformation module is by using a series of directional couplers 342, low-radius bends 344, and spiral waveguides 346 for path-length difference segments, electrodes 348 for high frequency modulation using a high frequency electrical signal 350 and 2 optical outputs ports for photon splitting to obtain photons in transformed states 352. By controlling the high-speed modulation electrical signal and bandwidth of lithium niobate, one can rapidly control the optical path length travelled by signal and idler photon thus tailoring the random numbers in real time for certain applications.

Figures 1, 1A, 2, 3, 4:
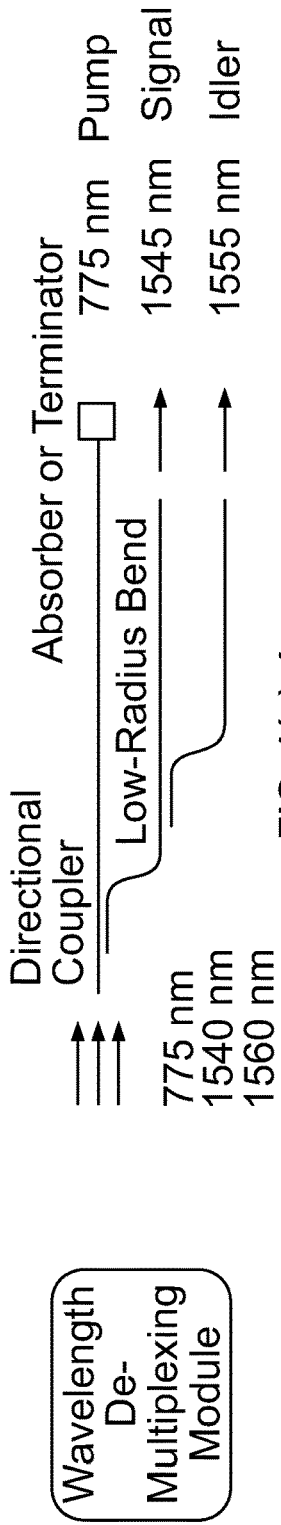
Figures 1, 1A, 2, 3, 4, 5, 6, 7, 8, 9:
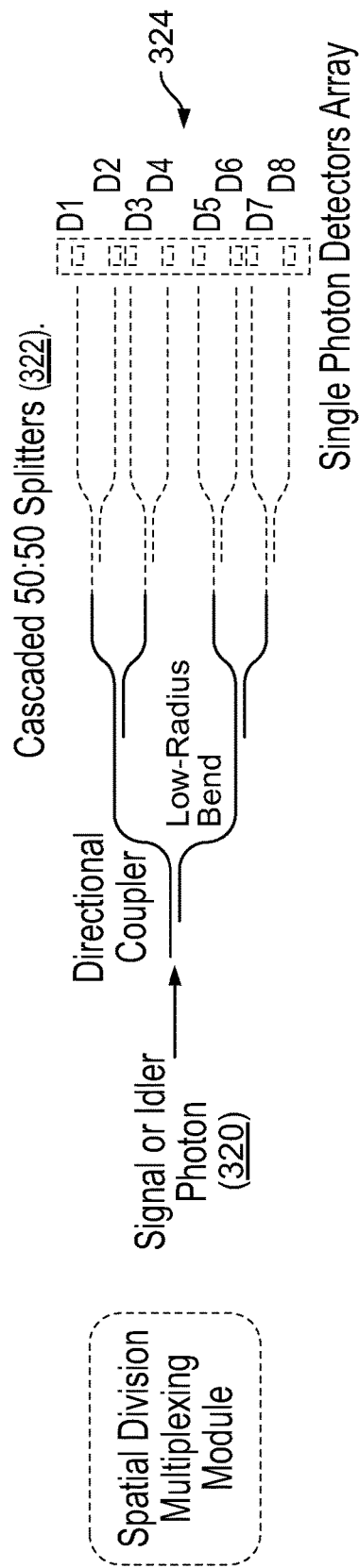
Figures 1, 1A, 2, 3, 4, 5, 6, 7, 8, 9, 10:
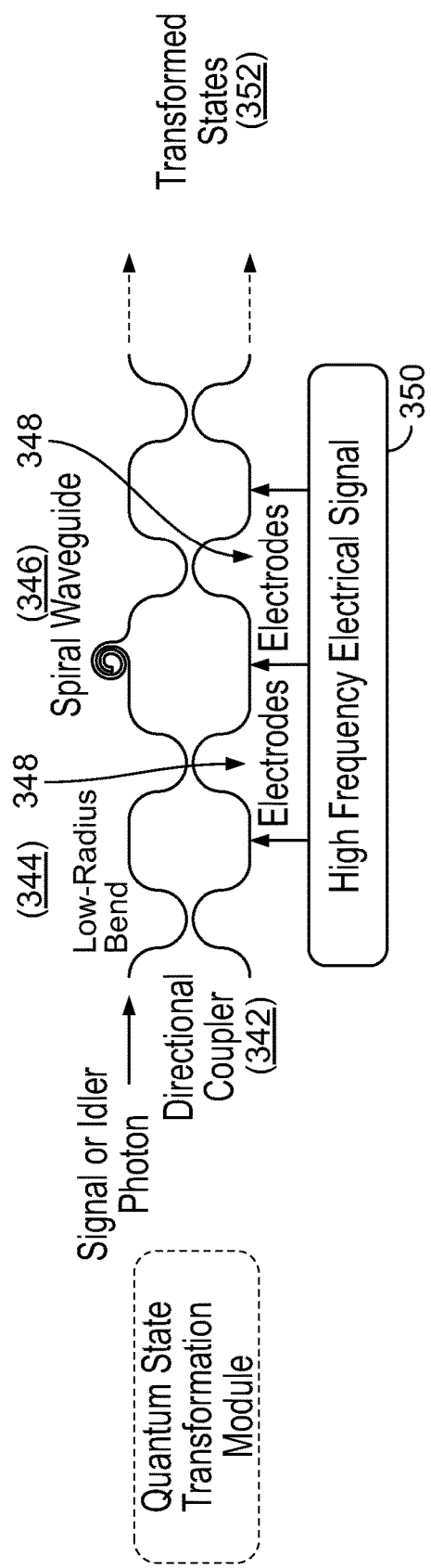
Figure 2:
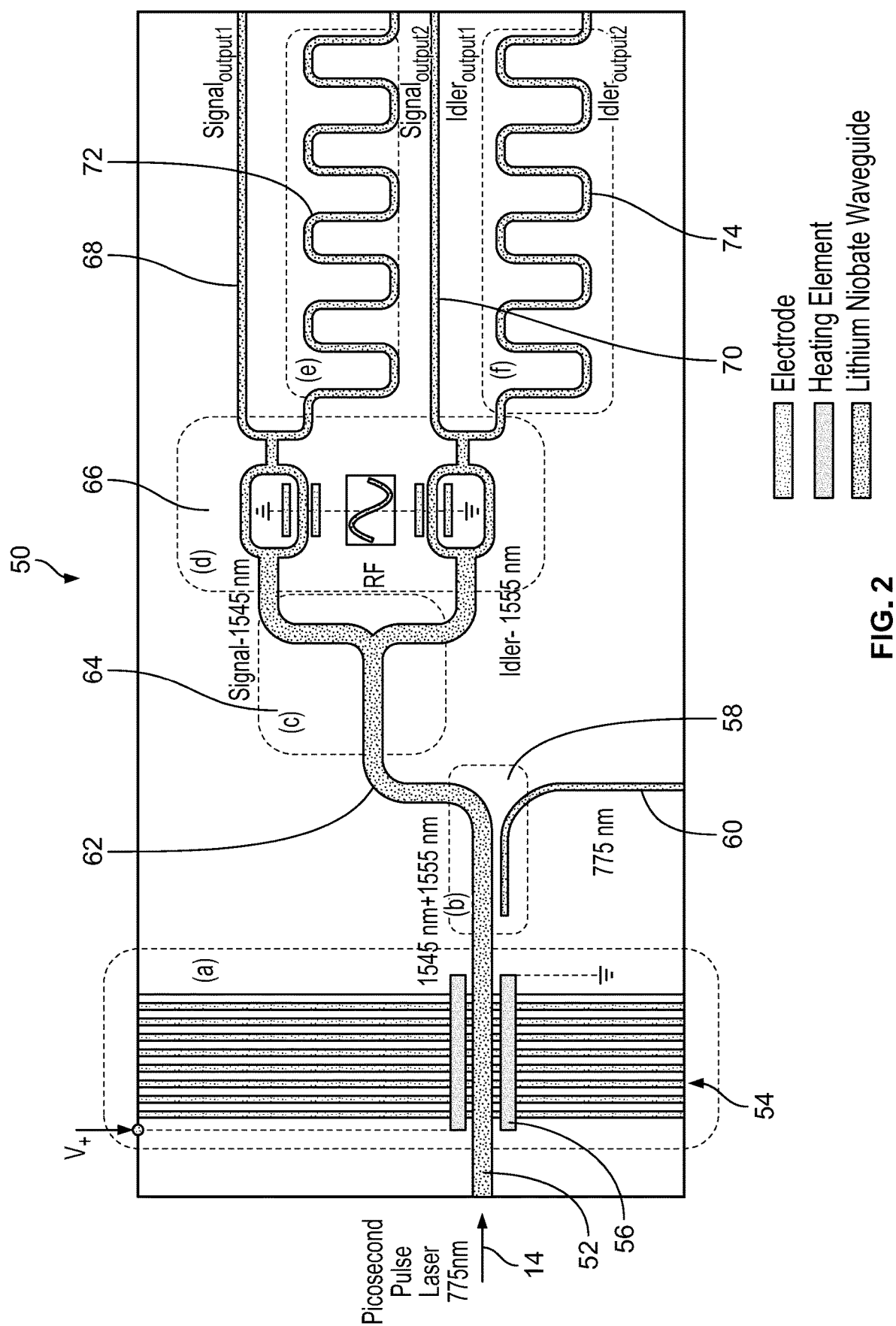
Figure 10A:
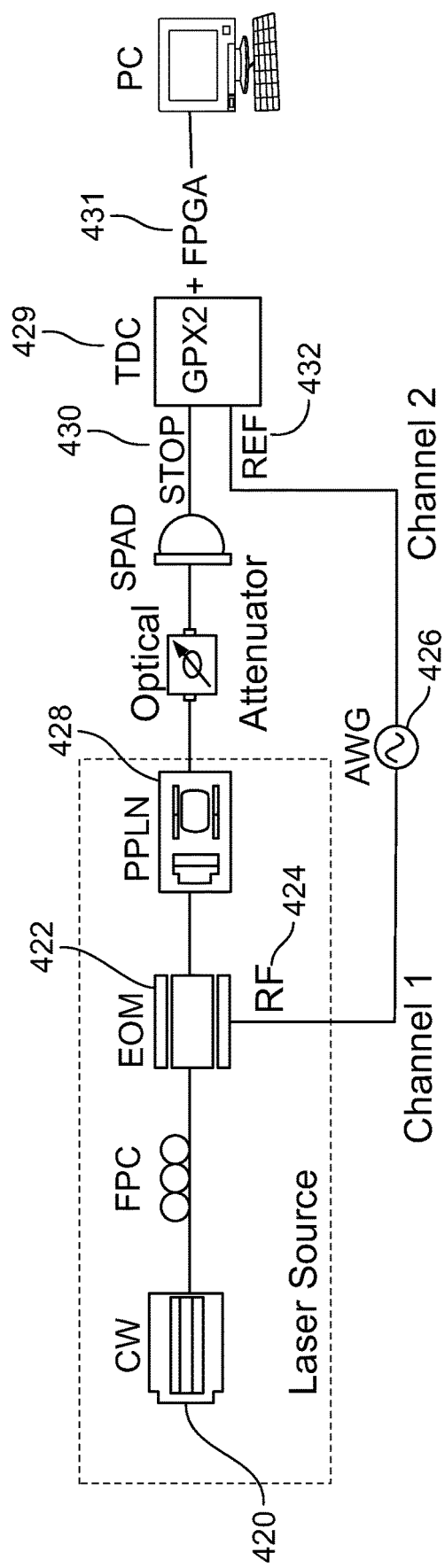
FIG. 10(a) shows an exemplary experimental setup for generation of quantum random numbers in custom probabilistic distributions in accordance with an embodiment of the present disclosure.
Figure 10B:
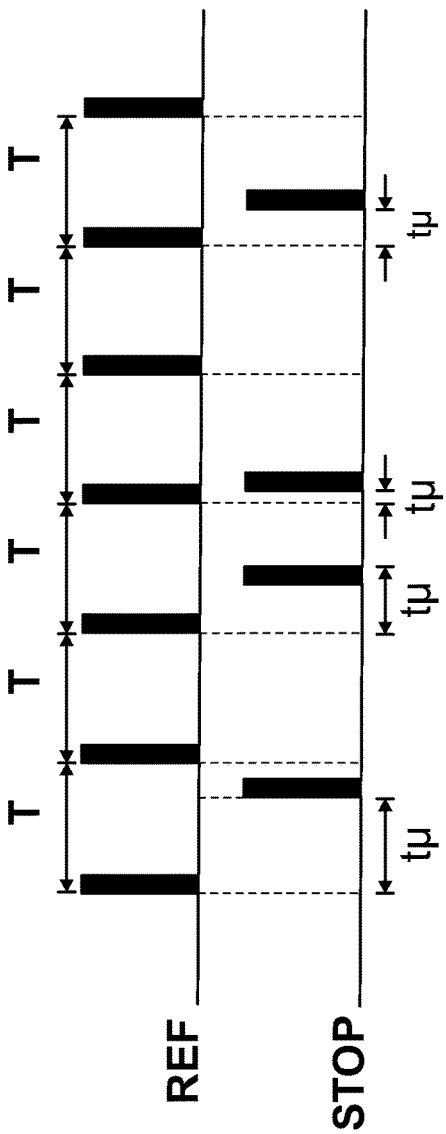
FIG. 10(b) illustrates a photon arrival time measurement scheme in accordance with an embodiment of the present disclosure.

In an embodiment, a realization of this QRNG and procedures disclosure is given in FIG. 10. FIG. 10(a) shows an exemplary experiment setup and FIG. 10(b) illustrates the photon arrival time measurement, second-harmonic generation (SHG) is the nonlinear process to create mode-shaped optical pulses at 775 nm. Intensity of a continuous wave laser 420 with narrow linewidth (about 25 kHz) and excellent power stability (+/−0.03 dB) at 1550.65 nm is modulated using an electro-optical modulator 422 (EOM) which is driven by radio-frequency (RF) pulses 424 at a 1 MHz repetition rate. The RF pulses 424 are provided by an arbitrary waveform generator 426, whose customized pulse shapes are created by defining high-resolution modulation functions with 10-bit amplitude resolution and 16,384 temporal data points. The EOM output, which is mode-shaped optical pulses, is then coupled into a periodically poled lithium niobite 428 (PPLN) waveguide to generate second-harmonic (SH) pulses at 775.33 nm via SHG. The EOM 422 is operated in its linear response region by applying the modulation voltage on the EOM 422 well below its half-wave voltage. To eliminate undesirable bias in the probability distributions of the generated random numbers, the temporal profiles of the created optical pulses can be monitored with a high-speed photodiode for verification and as a feedback for optimization of RF pulses. The SH pulses are then filtered and heavily attenuated to a single-photon level with the mean photon number n<<1 per pulse. Afterward, they are collected into a single-mode fiber and detected by a free-running silicon avalanche photodiode (Si-APD) with 12.5% quantum efficiency and ultralow dark count (≈1.4 Hz). As shown in FIG. 10(b), each detection event triggers an analog electrical pulse with 10 ns full width at half-maximum (FWHM), which is sent to a data acquisition unit (a time-to-digital converter 429 (TDC) controlled by a FPGA 431) as a STOP signal 430. At another TDC 429 input, a deterministic electrical pulse train from the AWG 426 (10 ns FWHM, 1 MHz repetition rate) is used as the reference (REF) signal 432. The arrival time of both the REF and STOP pulses are digitized and compared in the TDC 429 where their difference is returned with 10-ps timing resolution and 1-ps time-bin size. The period of the REF signal 432 is set at 1 μs, corresponding to the 1 MHz repetition rate. Given the 10-ps timing resolution of the TDC 429, we apply the time series binning to obtain the time-bin size of 10 ps so that the photon detection can occur over a total of 100,000 time bins, whose location is recorded to generate QRNs. With N time bins during a REF pulse period, each photon detection is truly randomly fall in any bin, thus creating high-dimensional random numbers. The generation of QRNs in arbitrary probability distribution is controlled by switching to RF pulse 432 whose shape corresponding to the desired distribution.

Figures 11A, 11B, 11C:
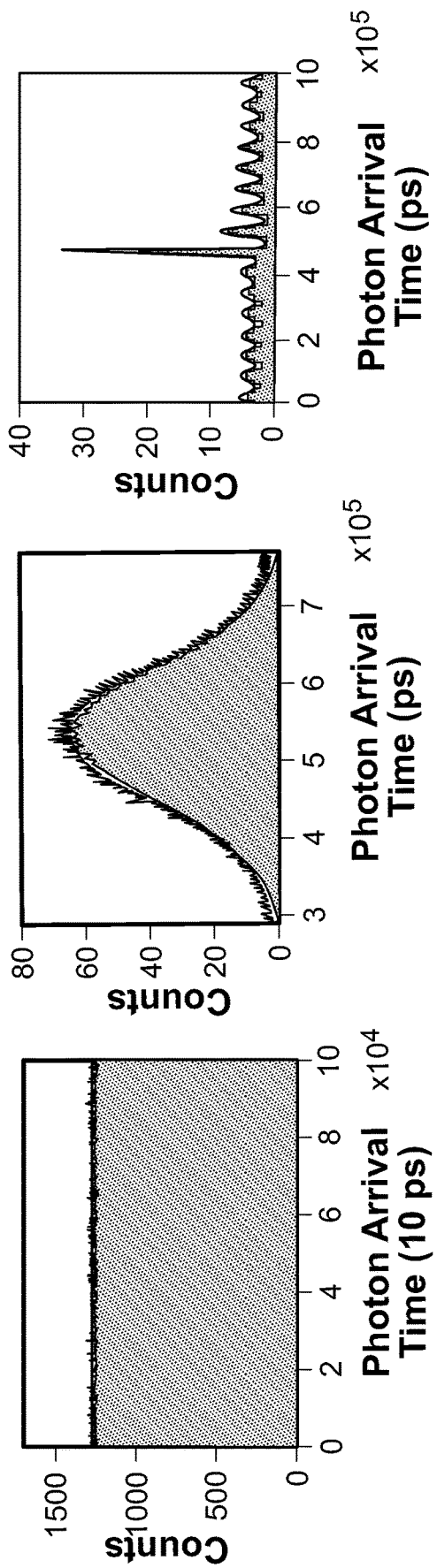
FIG. 11(a) is a chart of quantum random numbers in a uniform distribution generated via the experimental setup illustrated in FIG. 10.
FIG. 11(b) is a chart of quantum random numbers in a normal distribution generated via the experimental setup illustrated in FIG. 10.
FIG. 11(c) is a chart of quantum random numbers in a modified Bessel distribution generated via the experimental setup of FIG. 10.

FIG. 11 shows typical histograms of the QRNs directly generated in a uniform (FIG. 11(a)), Normal (FIG. 11(b)) and modified Bessel (FIG. 11(c)) distribution obtained from the aforementioned experimental setup. 0.2 billion, 8.8 million and 0.76 million QRNs were plotted respectively. Each histogram follows closely to the designed probability distribution envelope.

A simple device on a nano-photonics chip 50 to perform the disclosed QRNG methods and procedures is illustrated in FIG. 2 in accordance with an embodiment of the present disclosure, illustrating an exemplary system on a nanophotonics circuit for generating random numbers and randomness verfication. A lithium niobate nanowire waveguide 52 receives pumped laser light 14 from laser 12, generating correlated photons from the nonlinear lithium niobate optical medium. The photons spontaneously generated are in quantum correlation or entanglement states, as dictated by the conservation of energy, momentum, angular momentum, etc. For example, for a properly periodically poled lithium niobate waveguide 52 (at interference filter 58), when pumped with laser light at 775 nm wavelength, a pair of photons, at 1555 nm and 1545 nm wavelength, can be created and collected at the output of the waveguide 52. When the 775 nm laser beam is a continuous wave, i.e., its optical power and other properties do not vary in time, but photon pairs are created randomly in time. The distinguishable temporal modes that created photons subtend is determined by the duration of the laser pumping of the nonlinear waveguide 52 and the phase matching bandwidth for the nonlinear process. By using different laser durations, it is straightforward to adjust the number of temporal modes over a vast range, e.g., from 2 to 10,000. Laser light at 775 nm wavelength can comprise a single frequency, emitting radiation in a single resonator mode with narrow optical emission bandwidth., e.g., 775 nm and negligible intensities at all other wavelengths. The power of the laser light at 775 nm can be adjusted either to increase or decrease the photon generation probability as required by the end user.

By using pumping lasers 12 that generate light in pulses, the time-frequency properties of the generated photons can be modified to create random numbers obeying certain statistical properties. In one embodiment, the pulses are created by using a technique called "optical arbitrary waveform generation" so that the desirable statistical properties of the random numbers can be coded in the waveform of the pump lasers 12 and subsequently, the created photons. In this way, random numbers can be created in custom probability distributions without the need for post processing.

An example on using a field programmable gated array (FPGA) to schedule, collect, and stream or save QRNs directly to a computer, USB, etc. from single photon detectors. The FPGA is also functioned as a digital oscillator frequency output. Via the same interface with data collection, it can be controlled to customize arbitrary waveform corresponding to a specific probability distribution and waveform optimization with a feedback. From QRNs data, the FPGA processes and interprets the true probability distribution and compares with the ideal desired probability distribution. Additionally, it compares QRNs generated by the signal and the idler to verify the entanglement/correlation between the data set. Outputs from these analyses decide the adjustment for input RF waveform to the photon generator as well as voltage level to control the micro-heater on the photonics chip. To characterize and verify the probability distribution of our QRN, a feedback system utilized by the FPGA as follows. From QRN data, the FPGA processes and realizes the true probability distribution. After that, comparing with the ideal desired probability distribution, the FPGA automatically adjusts the waveform and sends it back to the photon generator.

Photon generation in nonlinear media is efficient only when the process is phase matched. While such phase matching can occur naturally for certain nonlinear media and a wavelength combination, often is necessary to use a technique called "quasi phase matching." In accordance with one aspect of the present disclosure, this same technique is applied on the chip 50. For some ferroelectric and dielectric nonlinear media such as lithium niobate, the "quasi phase matching" can be achieved by applying an external electric field periodically, which creates a periodically poled or domain-inverted crystal structure. This may be accomplished by applying a voltage V to conductive lines 54, e.g., gold lines deposited on the chip 50 proximate the waveguide 52, as controlled by the computer 22 or electronic micro-processor unit. For efficient photon generation on the chip 50, the period of the nonlinear media depends on the wavelengths of the pump light and generated photon pairs and the chip temperature. An on-chip, low-power heater 56 can be used to provide localized heating on the periodically poled section of the waveguide 52 for precise tuning of the phase matching. The operation pump wavelength, distributions, and correlations of the random numbers can be tuned via precise temperature control based on the phase matching requirement.

Depending on the application, more than one nonlinear media (lithium niobate waveguide 52) may be used for simultaneous photon generation. For example, two waveguides of the same material and similar optical properties can be placed side by side, and pumped at the same time to create photon pairs individually. In some embodiments, the outputs from different media can be mixed to form quantum states of many photons, including those spanning a high-dimensionality Hilbert space. In some embodiments, the output of one media is directed to the input of another media, in order to create high-level quantum correlation or entanglement states.

Having been generated in the waveguide 52, the photons are picked and separated by one or more interference filters 58 nano-fabricated on the chip 50, with 775 nm laser light being sent along pathway 60 off the chip 50 and the 1545 nm and 1555 nm light following pathway 62 for subsequent distribution to different pathways for linear operations and nonlinear interactions. The linear operations are realized by a sequence of connected optical elements, such as beam-splitters, waveplates, electro-optical modulators, wavelength multiplexers, wavelength demultiplexers, and so on. In one embodiment, the photons that are present in pathway 62 are separated according to their wavelengths by an on-chip wavelength division demultiplexer 64. The bandwidth of a wavelength division demultiplexer 64 can be tailored to match the time duration of the created photons. The wavelength separation can be highly scalable to maximize random number generation, taking advantage of the multimode nature of photon pair generation. As an example, a series of resonator cavities with a well-defined free spectral range and linewidth can be used as sequential spectral filtering for various wavelength combinations, such as 1545 nm and 1555 nm. The outputs of the wavelength division demultiplexer 64 (depending on the filtering needs, the demultiplexer can consist of multiple devices), each at the signal and the idler wavelength are connected to an on-chip optical modulator 66 having an electro-optic modulator and a Mach-Zehnder interferometer. The on-chip optical modulators deterministically route the signal and idler photons, either into a straight waveguide 68, 70, respectively or to spiral waveguides 72, 74 of varied length, the latter for defining the single photon temporal modes in real time. Thus, the correlation of the random numbers generated from the photon detection can be deterministically programmed in real time. The two electro-optic modulators 66 can be driven by external high-speed, wide-bandwidth electrical modulation signal, such as in tens of GHz, for correlation and statistical customization of the random numbers. The electrical modulation signal to the modulators would be send by the computer 22 acting through interface 26.

The nonlinear interactions between the photons occur in highly nonlinear optical media, such as lithium niobate nanowaveguides, microdisks, and microrings. Each of the microdisks and microrings are coupled with the nanowaveguides through an evanescent interface. In some embodiments, two photons are combined in the nonlinear waveguide 52 to generate a new photon at the sum frequency or difference frequency of the two photons. Because of the phase matching requirement, this process implements a logical operation between the two photons, where the newly created photon carries the joint quantum states of the two photons. The new photon can then be further manipulated and interact with other photons to form complex many-photon states for producing a random number with desirable statistical properties with carefully custom tailored correlation between them. In another embodiment, two photons of distinct wavelength can interact to change each other's quantum states through optical parametric nonlinear processes such as quantum Zeno blockade and cross phase modulation. If either or both of the photons are in multiple electromagnetic modes, after interaction, they will be in entangled quantum states. They can then be detected to generate the random numbers or be further manipulated or interact with other photons to form complex quantum states.

The statistical properties of the quantum random numbers can be customized and reconfigured in real time using the optoelectronic effects. This includes applying a bias voltage V via conductors 54 on the nanowaveguide 52 for the photon pair generation to modify its phase matching conditions, applying a high-speed radio-frequency signal to modulate the phase and/or the carrier frequency of the photons, and steering the propagation of the photons through an electro-optic modulation circuit 66 on chip 50. All controls can be realized through optoelectronic effects. Because of the extremely small dimensions of the circuits, which are typically on the order of microns or submicrons, the controlling electronic signals only need to have very small voltage, such as much less than 1 volt.

The photons that pass through the chip 50 are tested by the detector 20 (FIG. 1) for genuine quantum entanglement to provide an independent verification of the random numbers in desirable, custom statistics and correlations in real time. This verification can be performed randomly in real time, in which the photons are probabilistically routed to an entanglement measurement circuit by using a directional coupler, or periodically as programed, in which the photons are switched out to test their entanglement by using optical switches. An example optical switch is the OSW22-1310E-MEMS 2×2 Fiber Optic Switch by Thorlabs, Inc. Unlike any statistical test on the generated random numbers, this independent verification directly probes the quantum properties of the single photons, which eliminates the possibility of spoofing or any backdoor operation via external or internal attacks.

In one embodiment, the photons are created in entangled polarization states. The entanglement is then quantified by measuring the correlation of the photons in joint complimentary state bases, such as the so-called Bell states. In other embodiments, the photons are created in entangled time-frequency states. The entanglement is then quantified by measuring the time correlation and frequency anti-correlation between the two photons. In all cases, the random numbers are determined to be trustworthy and genuine when the measured entanglement reaches or exceeds a threshold.

Figure 3A:
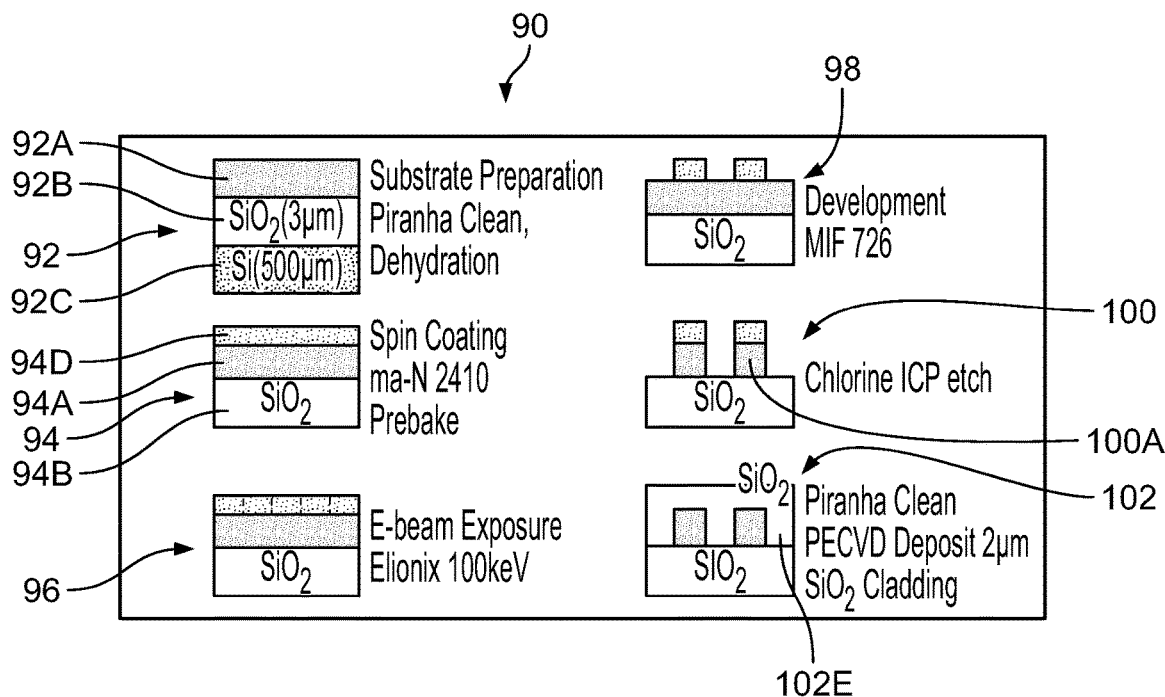
FIG. 3A is a series of schematic diagrams showing six phases in the nano fabrication of a lithium niobate nanowaveguide in accordance with an embodiment of the present disclosure.

FIG. 3A shows an example of a nanofabrication sequence 90 for lithium niobate nanowaveguides, microring, microdisks and Mach Zehnder modulators in accordance with the present disclosure. A lithium-niobate on-insulator wafer 92 with a 500-nm lithium-niobate thin film 92A is bonded on top of a 3-micron silicon oxide layer 92B, supported on a 500-micron thick silicon substrate 92C. After piranha cleaning and dehydration, a 10×10 mm size sample 94 with LN layer 94A and silicon oxide layer 94B (corresponding to layers 92A, 92B) is immersed into adhesion promoter (surpass 3000+) prior to spinning a 1000-nm thick layer of E-beam resist (ma-N 2410) 94D on top of the LN film 94A. The sample 94 is pre-baked to harden the resist layer 94D prior to E-beam lithography (EBL, Elionix ELS-G100) patterning resulting in laminate sample 96. The sample 96 is exposed to E-beam lithography. Following the patterning, the sample 98 undergoes standard resist development and post-bake procedures. Then, the sample 100 is dry etched with an Argon milling process using Oxford Plasmalab-100 Inductively Coupled Plasma (ICP) system, which removes about 500-nm of lithium niobate device layer 100A, leaving sample 102. A 2-micron silicon dioxide layer 102E is deposited by Oxford PECVD as over-cladding. Finally, the chip is cleaved and polished to optical finish for input and output.

Figure 3B:
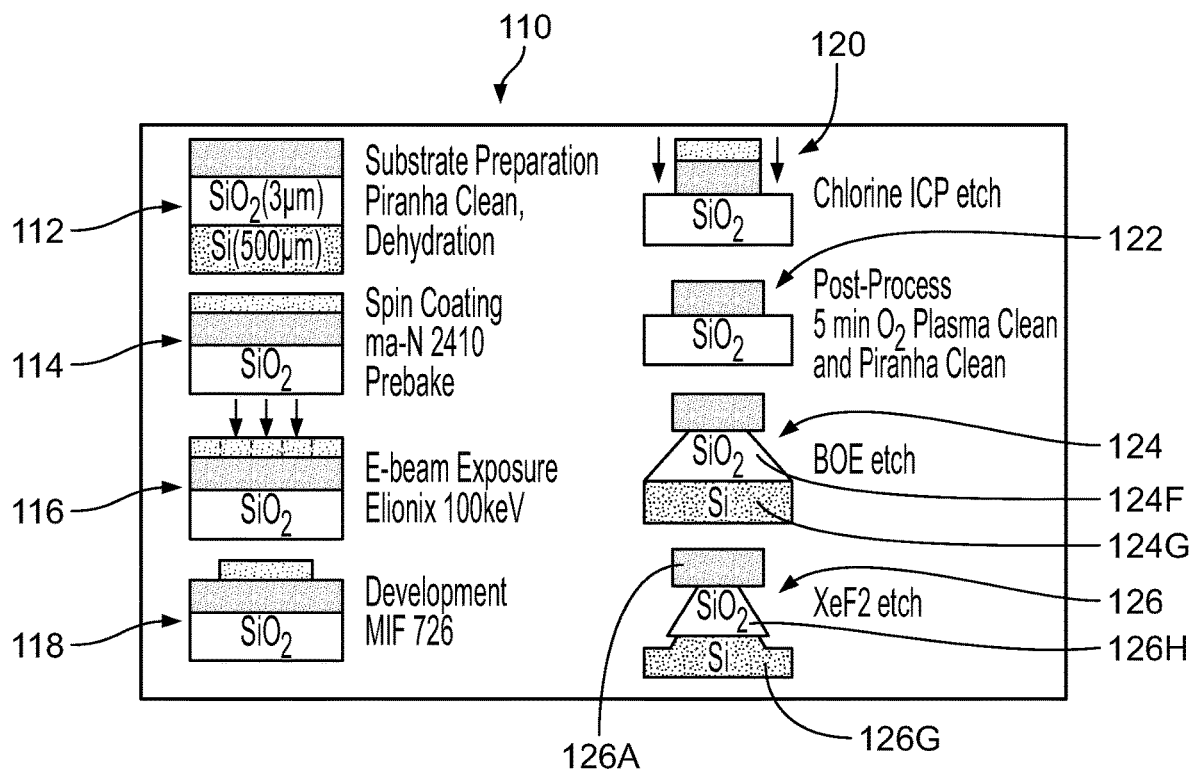
FIG. 3B is a series of schematic diagrams showing eight phases in the nano fabrication of a lithium niobate microdisk in accordance with an embodiment of the present disclosure.
Figure 4:
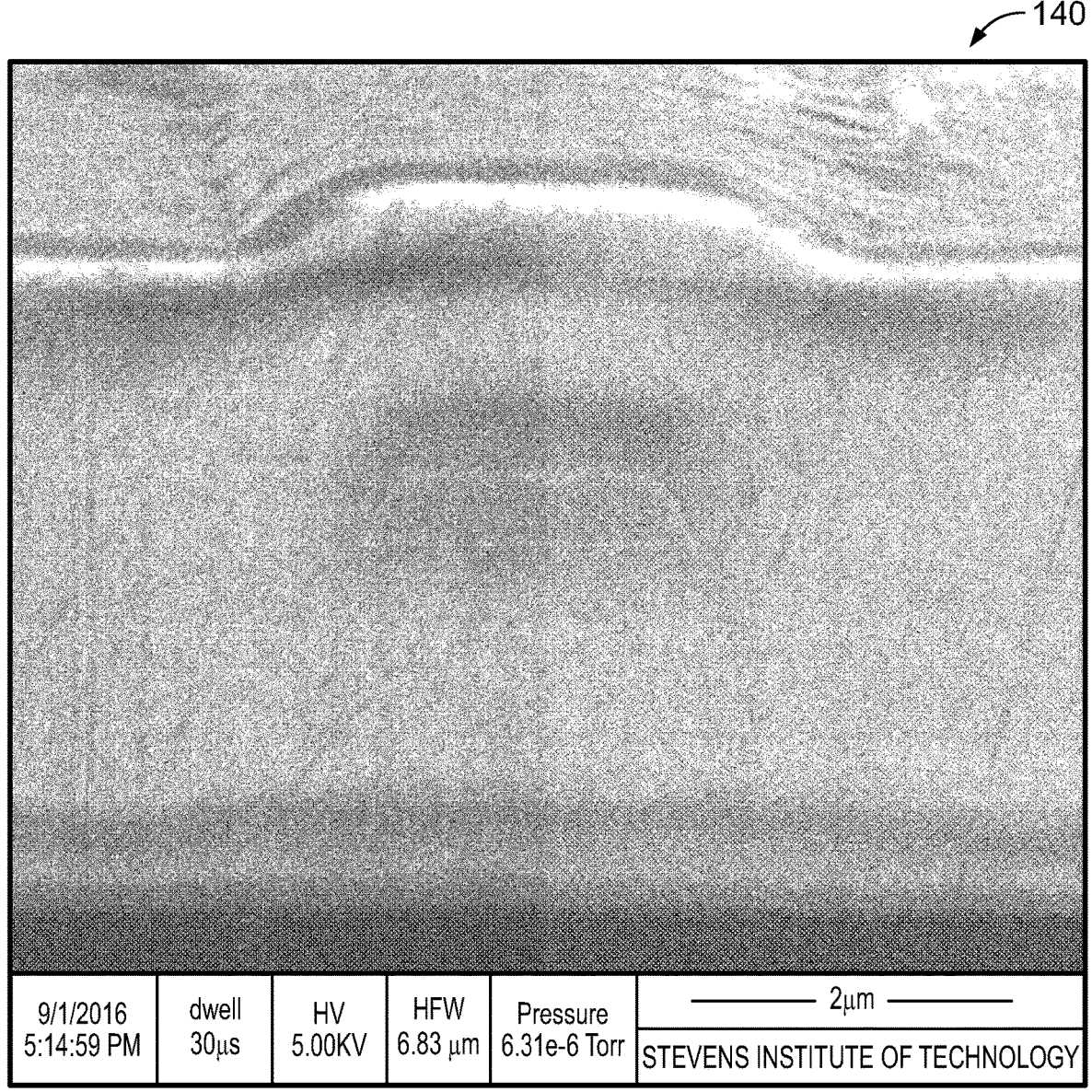
Figure 5:
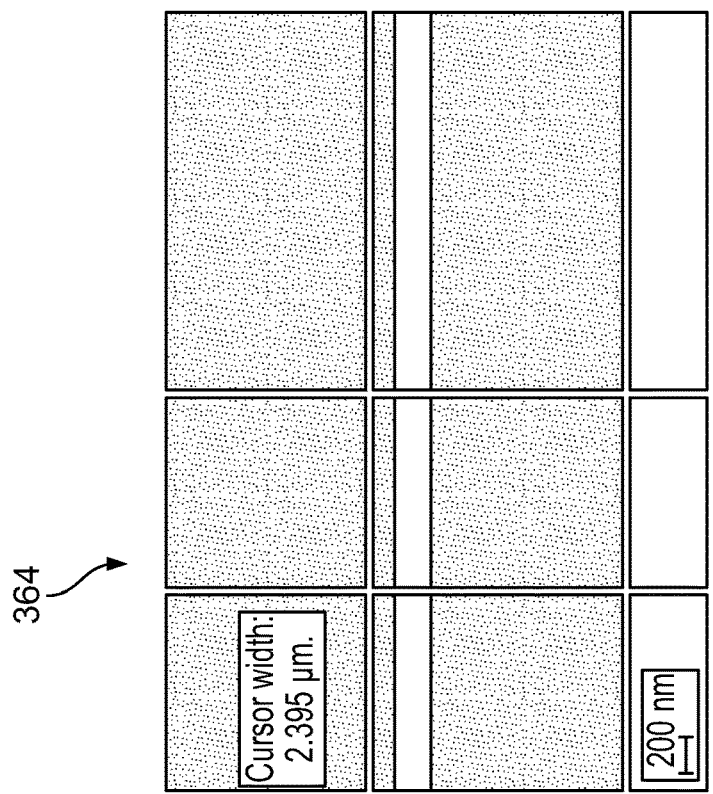
Figure 5:
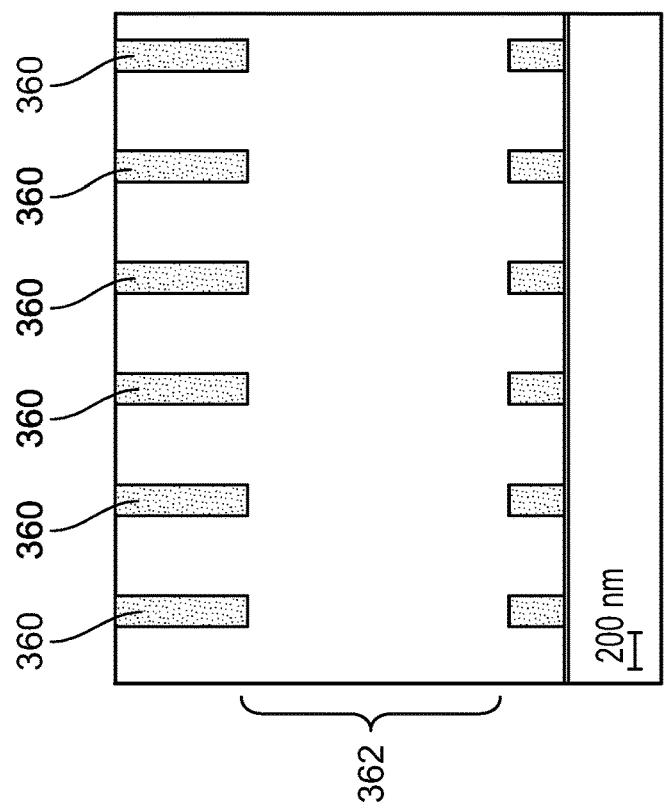
Figure 6:
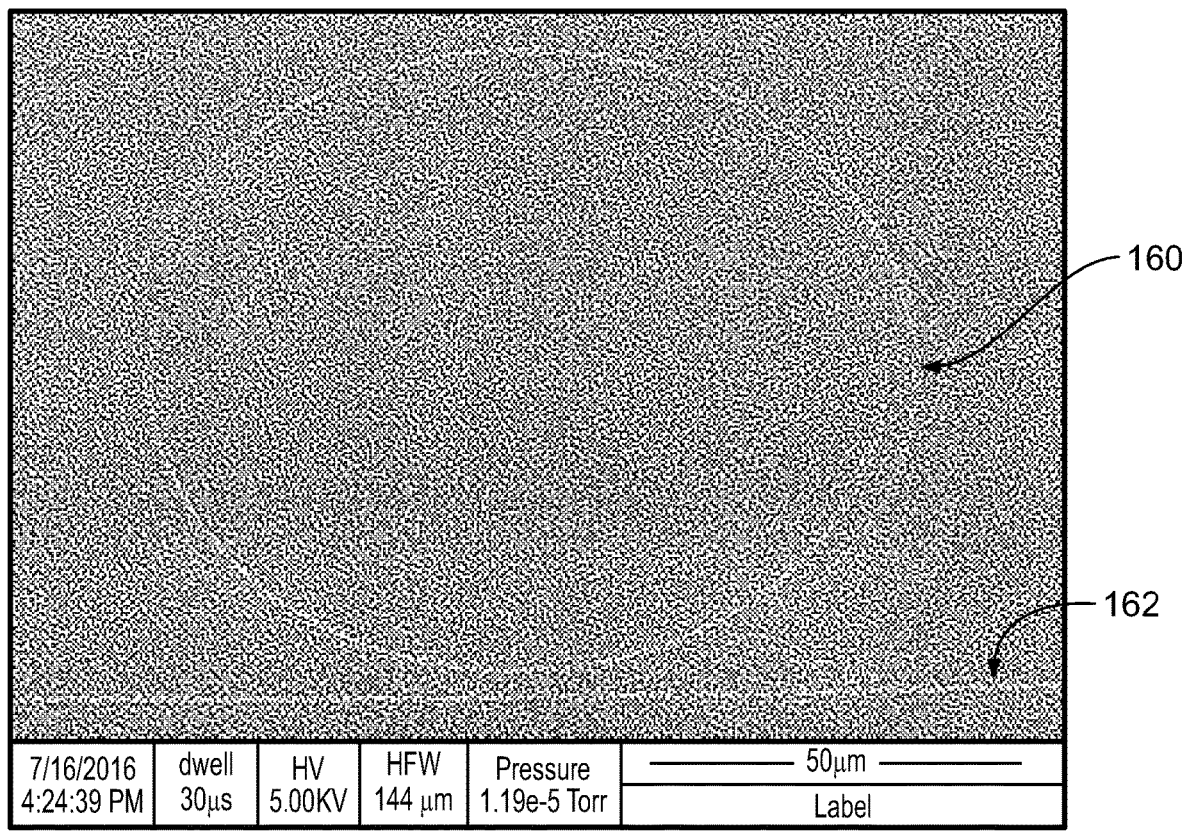

FIG. 3B shows that the fabrication process 110 of lithium niobate microdisks is similar to the process illustrated in FIG. 3A, with samples 112, 114, 116, 118 and 120 corresponding to the samples 92, 94, 96, 98 and 100 of FIG. 3A, but involves an additional step 122 of removing the residual e-beam resist and sputtering induces redeposited materials 124F on Silicon 124G after the dry ICP etching, by using RCA 1 (5:1:1, deionized water, ammonium hydroxide, hydrogen peroxide) solution. On the same wafer, lithium-niobate microdisks can be created using the fabrication procedure outlined in FIG. 3B, where after the device layer 124 of the lithium niobate microdisk with desirable dimension and geometry, an additional step of buffered oxide etcher selective wet-etching is applied to undercut the microdisk to form a pillar supporting structure 124F. As an option, Xenon difluoride (XeF2) vapor can be used later for highly selective isotropic etching on the silicon substrate 126G to create larger spacing 126H between microdisk 126A and substrate 126G.

FIG. 4 shows a lithium niobate nanowire waveguide 140 in accordance with an embodiment of the present disclosure and formed from a 4-inch Lithium-Niobate on-insulator (LNOI) wafer (a 500-nm lithium-niobate thin film on a 3-micron silicon oxide layer and a 500-micron thick silicon substrate) is used. After piranha cleaning and dehydration, the wafer is diced into mutiple 10×10 mm chips. A chip is immersed into adhesion promoter (surpass 3000+) prior to spinning a 1000-nm thick layer of electro-beam (e-beam) resist (ma-N 2410). The chip is pre-baked to harden the resist layer prior to e-beam lithography (EBL, Elionix ELS-G100, 100 keV) patterning. Following the patterning, the sample undergoes standard resist development (MIF 726) and post-bake procedures. Then, the sample is dry etched with an Argon milling process using an Oxford Plasmalab-100 Inductively Coupled Plasma (ICP) system, which removes about 500 nm of the lithium niobate device layer. The residual e-beam resist and redeposited materials after the dry ICP etching need to be removed by using RCA 1 (5:1:1, deionized water, ammonium hydroxide, hydrogen peroxide) solution. Later, a 2-micron silicon dioxide layer is deposited by Oxford Plasma enhanced chemical vapor deposition (PECVD) as over-cladding.

FIG. 5 shows a SEM image of the Ti—Au electrode teeth 360 pattern and the etched sub-micron PPLN waveguide. The poling region 362 is created on LNOI chip by applying several 20-ms high voltage electrical pulses on a Ti—Au electrode teeth 360 pattern. Then the waveguide pattern is fabricated by using additional electron-beam lithography and argon milling process. Later, a layer of 2 micron thick silicon dioxide is deposited (PECVD) as over-cladding. To the right, periodic poled waveguide 364 is shown after the application of electron-beam lithography and the argon milling processes to the periodic poled regime.

FIG. 6 shows a lithium niobate microring 160 with coupling nanowire 162 in accordance with the present disclosure. The fabrication of lithium niobate microrings is similar. However, to realize high-extinction-ratio (>40 dB) filtering effect for specific wavelengths, the radius of the microring and the gap between the microring and the nanowire are carefully designed.

FIG. 7 shows two cascaded microring resonators 380 and typical thermal tuning of the output spectrum of one microring. Two microrings 380 have slightly different radius (such as 40 µm and 38 µm). They are fabricated through a similar method as for microrings described above. After coated with 2 micron thick silicon dioxide via PECVD, 120 nm-thick Cr—W—Cr metal layers are sputtered on top of the chip and annealed at 400 C for 30 mins. Using the second time e-beam lithography, the micro-heater pattern is defined and formed by the following chlorine ICP etching.

Figure 7B:
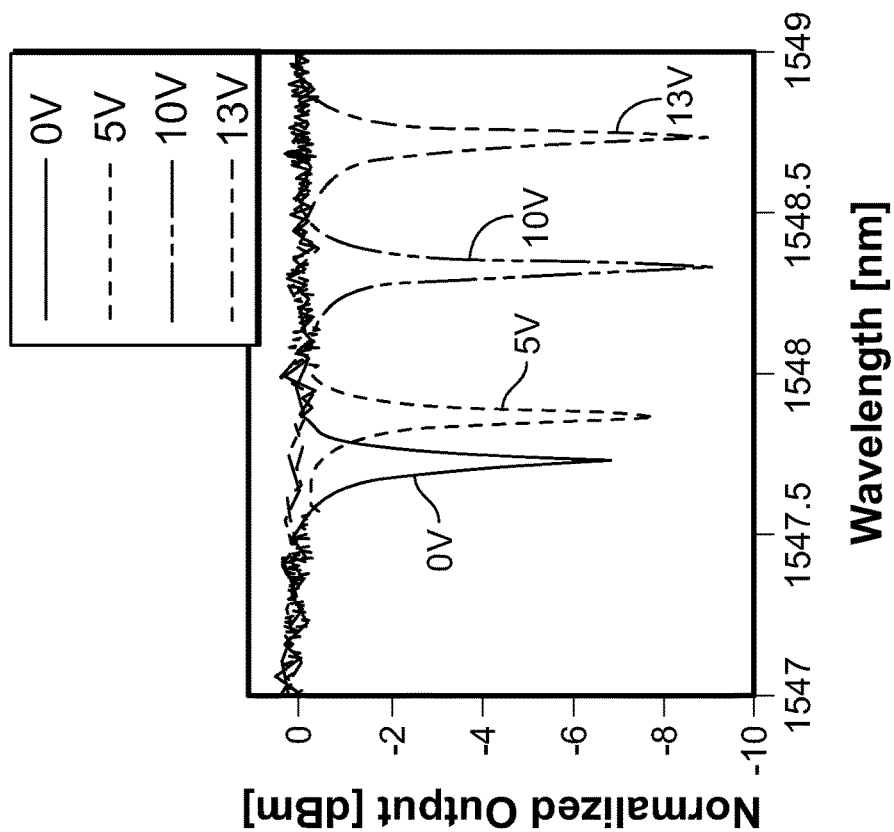
FIG. 7(b) is a chart showing the shift of cavity resonance under different applied voltages in accordance with an embodiment of the present disclosure.
Figure 7A:
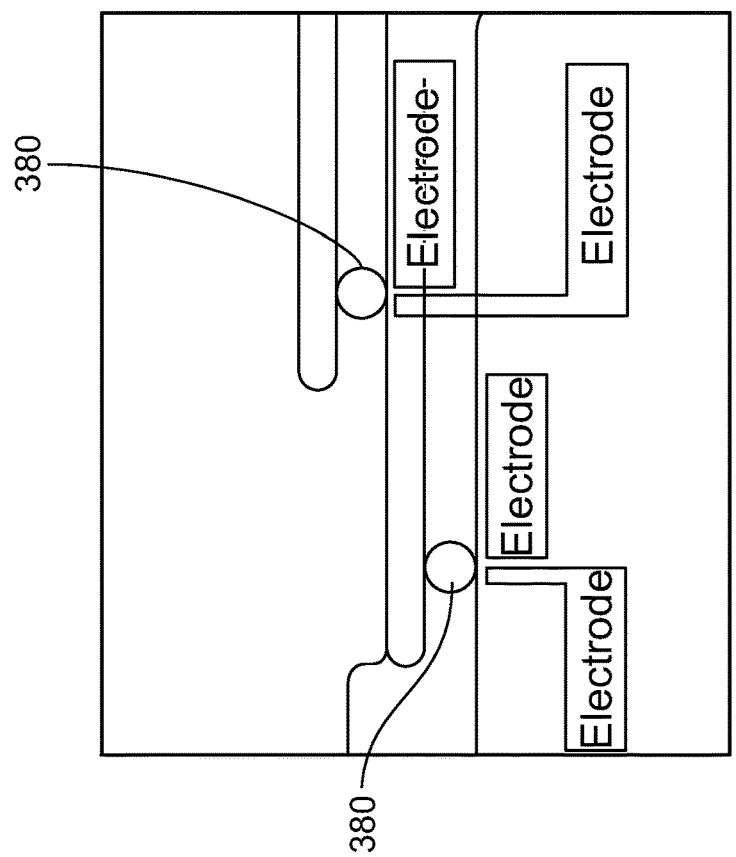
FIG. 7(a) is an optical image showing a circuit layer of a tunable optical filter in accordance with an embodiment of the present disclosure.
Figure 8:
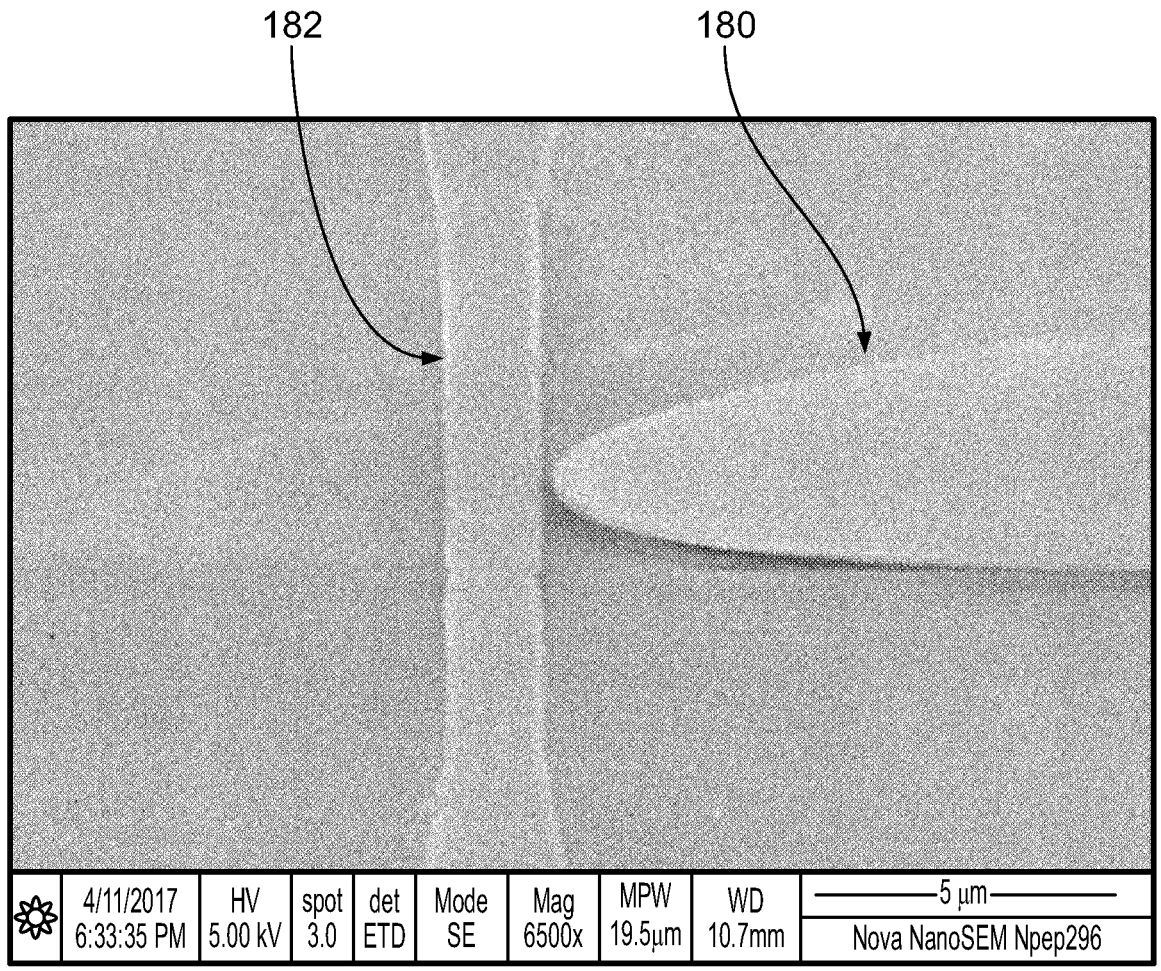

FIG. 7(a) shows an optical an optical image depicting the circuit layout of the tunable optical filter for use in the Entanglement Measurement Module 6 in FIG. 1(a). It consists of two sequential microrings, with each's resonance shifted by applying electronic voltage.

FIG. 7(b) shows the shifted cavity resonances under different applied voltages for a typical microring, for use in the Entanglement Measurement Module 6.

FIG. 8 shows an undercut lithium niobate microdisk 180 with a coupling nanowire 182 in accordance with an embodiment of the present disclosure. On the same chip, undercut lithium-niobate microdisks coupled with nanowire can be created using a selective etching technique. Follow the same fabrication procedures for the nanowires and microrings, microdisks evanescently coupled with nanowire structure sitting on silicon dioxide layer can be achieved. Then 2-micron positive e-beam resist (950 PMMA A11) is applied on the etched sample and prebaked. During the second-time e-beam lithography, a circular pattern (its radius is 4 µm larger than that of the microdisk) is written to partially exposure the microdisks. After development by MIBK:IPA (1:3), buffered oxide etcher (BOE, 6:1) is applied to selectively undercut the microdisk to form a pillar supporting structure to keep the coupling nanowire suspended.

Figure 9A:
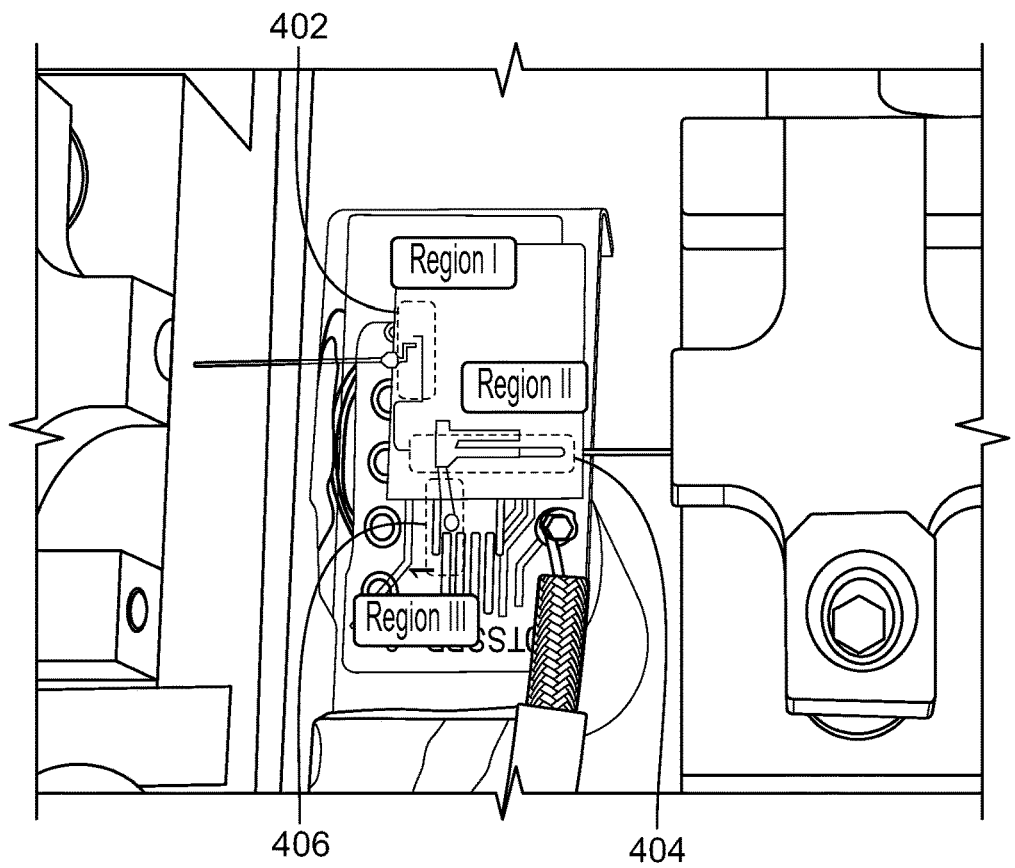
FIG. 9(a) shows an example of an integrated quantum random number generator on a LNOI chip in accordance with an embodiment of the present disclosure.
Figure 9B:
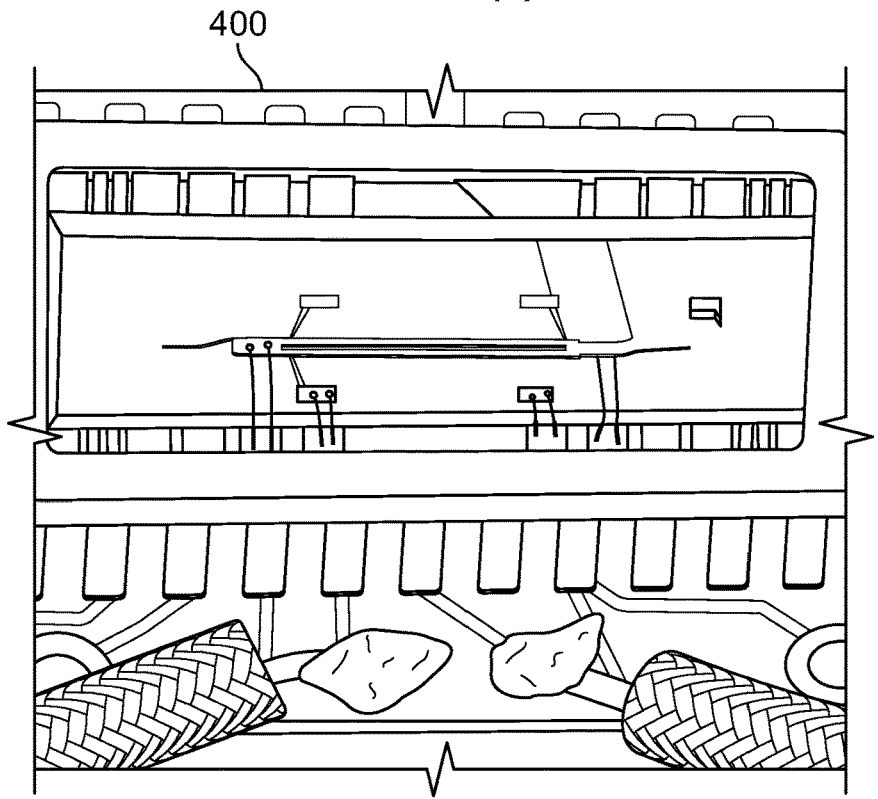
FIG. 9(b) shows a Mach Zehnder modulator in accordance with an embodiment of the present disclosure.

FIG. 9(b) shows a Mach Zehnder modulator 400 in accordance with an embodiment of the present disclosure. The Mach Zehnder structure is fabricated through a similar method as for the nanowires and microrings described above. Two layers layer of positive e-beam resist (495 PMMA A4 and 950 PMMA A4) are applied and prebaked. During the second-time e-beam lithography, the electrode circuit pattern is written with regard to the Mach Zehnder structures with a 100 nm resolution. After development by MIBK:IPA (1:3), an e-beam evaporator is used to deposit a 5-nm thin film of titanium and a 60-nm film of gold on the sample. Then using a metal lift-off process, an electrode circuit with MZI structures can be obtained as shown. Later, an aluminum wire-bonding machine is used to connect the chip to its lead-less ceramic chip carrier, which is soldered on an electronic board. The expected modulation speed can be up to 100 GHz with 30 dB extinction ratio with Vir can be as low as 1 V/cm.

FIG. 9(a) shows an example of the integrated quantum random number generator on LNOI chip in accordance with an embodiment of the present disclosure. The poling region (region I 402) is created on LNOI chip by applying several 20-ms high voltage electrical pulses on a Ti—Au electrode teeth pattern. Then the waveguide pattern and Mach Zehnder structure are defined using electron-beam lithography and formed by argon milling process. Following the similar process for Mach Zehnder modulator, the electrode circuit pattern is created on the same chip (region II 404). After the chip is diced and polished, an aluminum wire-bonding machine is used to connect the chip to an electronic board (region III 406).

As a benchmark for the evaluation of a random number generator, QRNs of the present disclosed have been exposed under variety of randomness standards and randomness test suites. First, the raw uniform QRNs are converted into binary, concatenated, and applied to the Dieharder battery of tests (DBT) Robert Brown and George Marsaglia, a well-known and well-accepted statistical testing suite. This suite requires a significantly larger sample size and provides comprehensive and stringent evaluations as it analyzes the P-values by a Kuiper Kolmogorov Smirnov test, which is highly sensitive to any statistical deviation from the uniform distribution. Our random numbers pass all the tests in the DBT package. A Statistical Test Suite (STS) for Random and Pseudorandom Number Generators for Cryptographic Applications by NIST is another well-known standard which used to ensure the unpredictability and randomness of the long random bits sequence by looking for "pattern", bias, and correlation between bit samples. Because the STS from NIST does not accept direct nonuniform random numbers, the inverse Box-Muller transformation is applied to turn 100 million raw Gaussian QRNs into uniform distribution. This STS ensures the unpredictability and randomness of the long random bits sequence by looking for predictable patterns, bias, and correlation between bit samples. These tests, together with the fact that the inverse Box—Muller transfer is sensitive to any statistics bias, clearly attest to the high quality of those Gaussian QRNs. Finally, to fully validate the quantum source of this present disclosed, min-entropy ($P_i$) estimation is performed for each probability distributed QRNs data set to measure the difficulty of guessing the most probable outcome of from the quantum entropy source, and therefore, 1 bit per bit entropy is ideal randomness. A typical data set of uniform QRNs gives the min-entropy as log 2(max Pi)=0.9897 per bit which is very close to the theoretical limit. Min-entropy values drop as expected for Gaussian at 0.8798 per bit and modified Bessel distributions at 0.8249 per bit indicating the decrease in complexity. Next, the Recommendation for the entropy sources used for Random Bit Generation test suite by National Institute of Standards and Technology (NIST) is applied as standards for cryptographic and computer security. Raw QRNs are converted to sets of 1 million 8-bit samples before examined to this test suite. QRNs also passed the independent and identically distributed (IID) test, which verifies that all samples are mutually independent, and each sample has the same probability distribution as others and pass the Chi-square test, with remarkably high degree of freedom. QRNG of this scheme can be examined with health tests which designed to ensure that the entire entropy source continue to operate as expected which means it aims to catch failures of the entropy source quickly and with a high probability.

Figure 12:
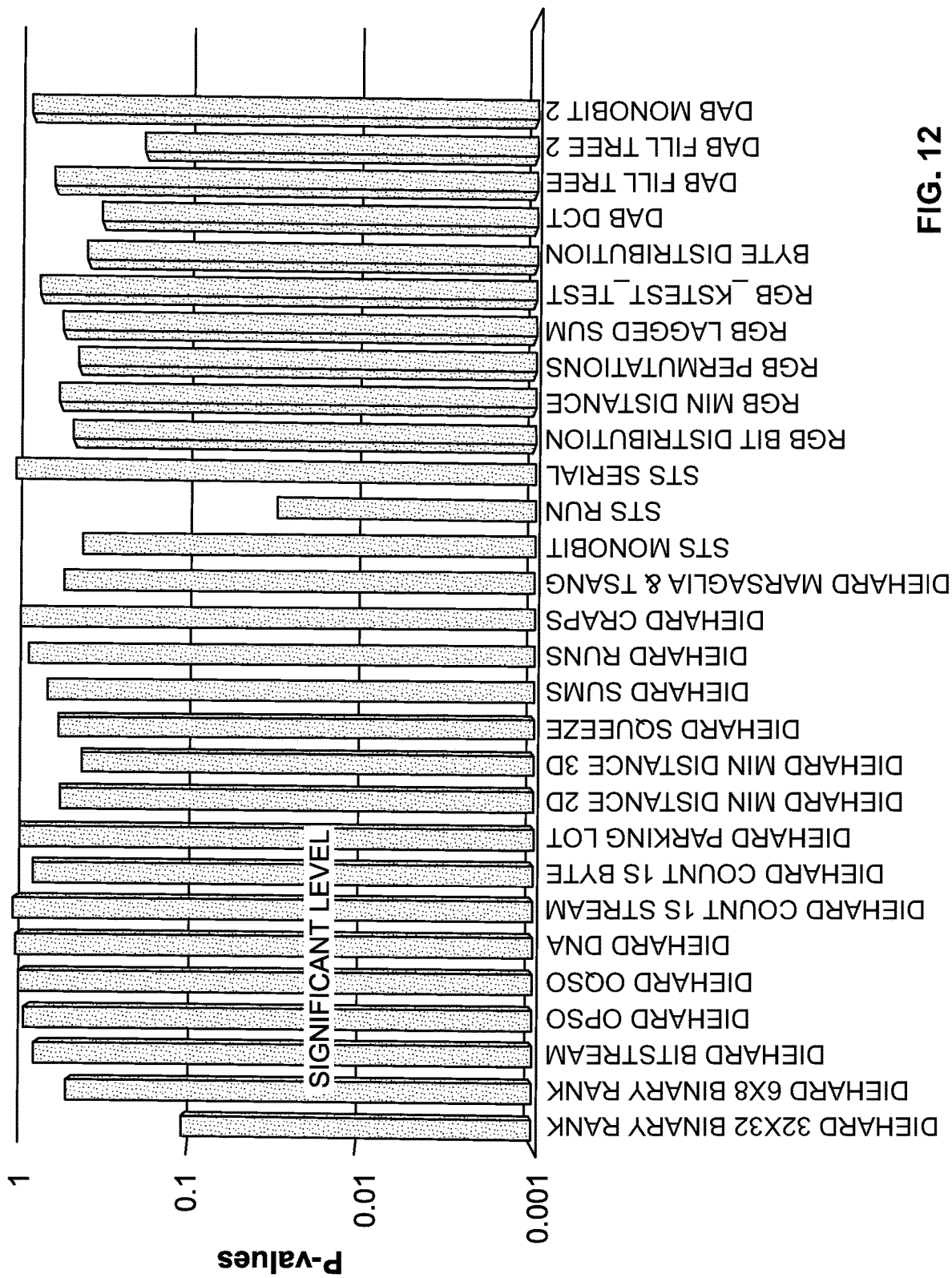
FIG. 12 shows the aggregated Dieharder battery test results of an embodiment of the present disclosure.
Figure 13:
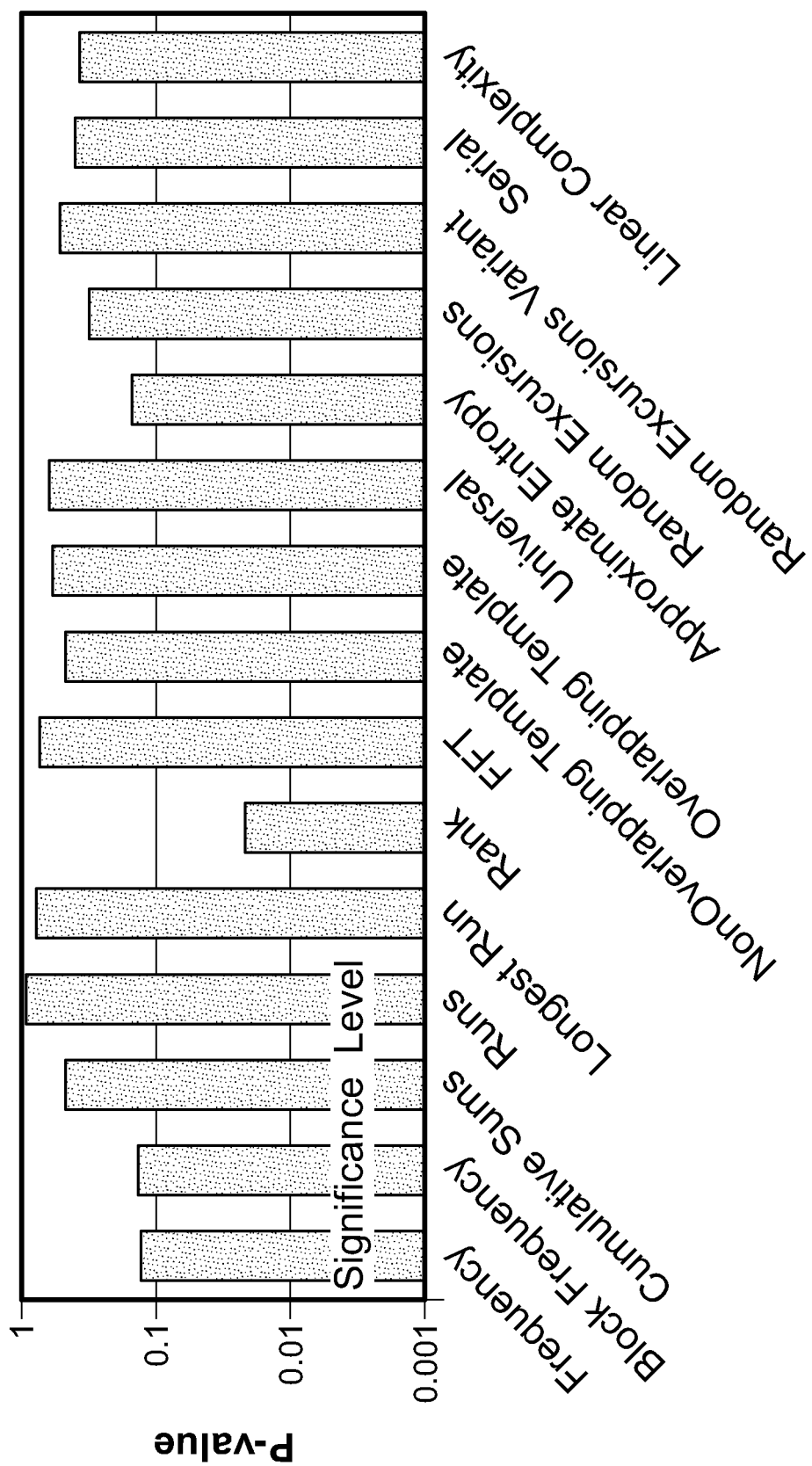
FIG. 13 shows a histogram of quantum random numbers converted into uniform quantum random numbers via the Box-Muller transformation in an embodiment of the present disclosure.

FIGS. 12 and 13 are Dieharder and NIST test results for the generated random numbers from the aforementioned proof of principle experiment. They show the random numbers passed both tests where all P-values are well above the significance level. FIG. 12 shows the aggregated Dieharder battery test results of 0.2 billion typical uniform QRNs, while FIG. 13 shows 8.8 million normal QRNs converted to uniform QRNs by using the Box-Muller transformation.

It will be understood that the embodiments described herein are merely exemplary and that a person skilled in the art may make many variations and modifications without departing from the spirit and scope of the claimed subject matter. For example, beside lithium niobate, other nonlinear optical materials, such graphene, boron nitride, GaAs, InP, SiN, Silica, InGaAs, chalcogenide glass, can be used. Also, other optical structures, such as photonic crystals, metamaterials, micropillars, can be used for the photon generation, manipulation, and detection. All such variations and modifications are intended to be included within the scope of the disclosure.

The invention claimed is:

1. A device for use in directly generating random numbers with certified randomness obeying customized statistical properties, comprising a laser source configured to generate laser pulses in shaped and verified waveforms and to verify and reshape any such generated laser pulses in real time, including through feedback control; a photon generator, positioned relative to said laser source so as to receive laser pulses therefrom, said photon generator being configured to generate photons having waveforms and correlated quantum states leading to random number generation with statistical properties as specified by a user; a separator, positioned relative to said photon generator so as to receive photons therefrom, said separator being configured to direct photons into separated optical paths based on at least one quantum characteristic; a set of detectors, positioned relative to said separator so as to receive separated photons therefrom, said set of detectors being configured to provide corresponding output signals to electronic circuits which are configured to generate random numbers corresponding to said statistical properties based on output signals provided by said set of detectors; and an entanglement measurement module, operable responsive to output signals provided by said set of detectors, to certify the genuineness of random numbers generated by said electronic circuits.

2. The device of claim 1, further comprising linear and nonlinear optical circuits in each of said optical paths to modify optical properties of the photons.

3. The device of claim 2, further comprising a benchmark module to test the random numbers against statistical tests for random numbers.

4. The device of claim 3, wherein the photons generated by said photon generator include a stream of single photons or pairs of entangled signal and idler photons in customized statistical properties.

5. The device of claim 4, wherein said photon generator includes a nonlinear waveguide or cavity made from lithium niobate that is phase matched for generating the photons.

6. The device of claim 5, wherein said at least one quantum characteristic includes two-photon entanglement in frequency and time domains.

7. The device of claim 6, wherein said separator is configured to separate the pairs of signal and idler photons into pairs of entangled signal and idler photons based on their wavelengths.

8. The device of claim 7, wherein said separator includes at least one wavelength division demultiplexing device.

9. The device of claim 8, further comprising first straight and spiral waveguides and second straight and spiral waveguides.

10. The device of claim 9, wherein said separator further includes optical modulators for routing signal and idler photons received from said at least one wavelength division demultiplexing device into the first straight and spiral waveguides and the second straight and spiral waveguides, respectively.

11. The device of claim 10, wherein each of said first and second spiral waveguides is provided with a predetermined length for determining and delaying single photon temporal modes in real time.

12. The device of claim 11, further comprising a laser modulator associated with said laser source.

13. The device of claim 11, wherein said laser source, said photon generator, said nonlinear waveguide, said separator, said first and second spiral waveguides, said entanglement measurement module, and said set of detectors are integrated on a single microchip.

14. The device of claim 1, wherein the laser pulses are created and reshaped by using an optical arbitrary waveform generator.

15. The device of claim 1, where the feedback control is based on the statistical properties of the quantum random numbers.

16. A device for use in directly generating random numbers with certified randomness obeying customized statistical properties, comprising a laser source configured to generate laser pulses; a photon generator, positioned relative to said laser source so as to receive laser pulses therefrom, said photon generator being configured to generate photons; a separator, positioned relative to said photon generator so as to receive photons therefrom, said separator being configured to direct photons into separated optical paths based on at least one quantum characteristic; optical circuits in each of said optical paths configured to modify optical properties of photons according to statistical properties as specified by a user, said optical circuits subject to real-time reconfiguration or feedback control; a set of detectors, positioned relative to said separator so as to receive separated photons therefrom, said set of detectors being configured to provide corresponding output signals to electronic circuits which are configured to generate random numbers corresponding to said statistical properties based on output signals provided by said set of detectors; and an entanglement measurement module, operable responsive to output signals provided by said set of detectors, to certify the genuineness of random numbers generated by said electronic circuits.

17. The device of claim 16, wherein said optical circuits are adapted to modify the photon properties using electro-optical modulators to change the waveform of the photons in real time.

18. The device of claim 16, where the feedback control is based on the statistical properties of the quantum random numbers.

19. A device for use in directly generating random numbers with certified randomness obeying customized statistical properties, comprising a laser source configured to generate laser pulses in shaped and verified waveforms and to reshape any such generated laser pulses in real time, including through feedback control; a photon generator, positioned relative to said laser source so as to receive laser pulses therefrom, said photon generator being configured to generate photons having waveforms and correlated quantum states leading to random number generation with statistical properties as specified by a user; a separator, positioned relative to said photon generator so as to receive photons therefrom, said separator being configured to direct photons into separated optical paths based on at least one quantum characteristic; optical circuits in each of said optical paths configured to modify optical properties of photons according to said statistical properties, said optical circuits subject to real-time reconfiguration or feedback control; a set of detectors, positioned relative to said separator so as to receive separated photons therefrom, said set of detectors being configured to provide corresponding output signals to electronic circuits which are configured to generate random numbers corresponding to said statistical properties based on output signals provided by said set of detectors; and an entanglement measurement module, operable responsive to output signals provided by said set of detectors, to certify the genuineness of random numbers generated by said electronic circuits.

20. The device of claim 19, wherein the laser pulses are created and reshaped by using an optical arbitrary waveform generator.

21. The device of claim 19, wherein said optical circuits are adapted to modify the photon properties using electro-optical modulators to change the waveform of the photons in real time.

22. The device of claim 19, where the feedback control is based on the statistical properties of the quantum random numbers.

* * * * *

UNITED STATES PATENT AND TRADEMARK OFFICE
CERTIFICATE OF CORRECTION

| | | |
|---|---|---|
| PATENT NO. | : 11,442,697 B2 | Page 1 of 1 |
| APPLICATION NO. | : 16/624768 | |
| DATED | : September 13, 2022 | |
| INVENTOR(S) | : Yuping Huang et al. | |

It is certified that error appears in the above-identified patent and that said Letters Patent is hereby corrected as shown below:

In the Specification

At Column 1, after the first paragraph, please add the following:
-- Statement Regarding Federally Sponsored Research
This invention was made with government support under contract number W15QKN-18-D-0040 awarded by The Army Contracting Command - NJ. The government has certain rights in the invention. --

Signed and Sealed this
Twentieth Day of June, 2023

Katherine Kelly Vidal
*Director of the United States Patent and Trademark Office*